(12) United States Patent
Hattori et al.

(10) Patent No.: US 10,719,721 B2
(45) Date of Patent: Jul. 21, 2020

(54) IMAGE PROCESSING APPARATUS, IMAGE PROCESSING SYSTEM, AND IMAGE PROCESSING METHOD

(71) Applicant: Hitachi, Ltd., Tokyo (JP)

(72) Inventors: Hideharu Hattori, Tokyo (JP); Yoshifumi Izumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 201 days.

(21) Appl. No.: 15/817,512

(22) Filed: Nov. 20, 2017

(65) Prior Publication Data
US 2018/0173973 A1  Jun. 21, 2018

(30) Foreign Application Priority Data
Dec. 15, 2016  (JP) .................................. 2016-243575

(51) Int. Cl.
| | | |
|---|---|---|
| *G06K 9/00* | (2006.01) | |
| *G06T 7/73* | (2017.01) | |
| *G01C 21/30* | (2006.01) | |
| *G06K 9/46* | (2006.01) | |
| *G06K 9/62* | (2006.01) | |
| *G06T 7/194* | (2017.01) | |

(Continued)

(52) U.S. Cl.
CPC ......... *G06K 9/00818* (2013.01); *G01C 21/30* (2013.01); *G06K 9/4652* (2013.01); *G06K 9/629* (2013.01); *G06K 9/6227* (2013.01); *G06K 9/6267* (2013.01); *G06T 7/73* (2017.01); *G06K 9/54* (2013.01); *G06T 5/007* (2013.01); *G06T 5/20* (2013.01); *G06T 7/11* (2017.01); *G06T 7/194* (2017.01)

(58) Field of Classification Search
CPC .. G01C 21/30; G06K 9/00818; G06K 9/4652; G06K 9/54; G06K 9/6227; G06K 9/6267; G06K 9/629; G06T 7/73; G06T 5/007; G06T 5/20; G06T 7/11; G06T 7/194
See application file for complete search history.

(56) References Cited

U.S. PATENT DOCUMENTS

| | | | |
|---|---|---|---|
| 2005/0232469 A1 | 10/2005 | Schofield et al. | |
| 2013/0101157 A1* | 4/2013 | Li ..................... | G06K 9/00805 382/103 |

FOREIGN PATENT DOCUMENTS

| | | |
|---|---|---|
| EP | 1 686 537 A2 | 8/2006 |
| EP | 3 096 264 A1 | 11/2016 |

(Continued)

OTHER PUBLICATIONS

Extended European Search Report received in corresponding European Application No. 17202824.3 dated May 3, 2018.

*Primary Examiner* — Tom Y Lu
(74) *Attorney, Agent, or Firm* — Mattingly & Malur, PC

(57) ABSTRACT

An image processing apparatus includes: a storage unit configured to store map information to which object information indicating an object and a position thereof is added, and a plurality of different classifiers for classifying an object in an image; an object detecting unit configured to detect an object in a target image; and an object recognizing unit configured to select any of the classifiers based on a photographing position that is a position at which the target image has been photographed and the object information added to the map information and, using the selected classifier, recognize the object detected by the object detecting unit.

14 Claims, 15 Drawing Sheets

(51) Int. Cl.
  *G06T 7/11* (2017.01)
  *G06K 9/54* (2006.01)
  *G06T 5/00* (2006.01)
  *G06T 5/20* (2006.01)

(56) References Cited

FOREIGN PATENT DOCUMENTS

GB  2495807 A  4/2013
WO  2006/101012 A1  9/2006

* cited by examiner

Map         Image N
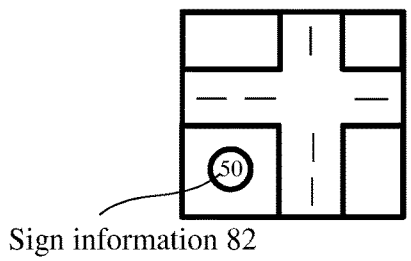 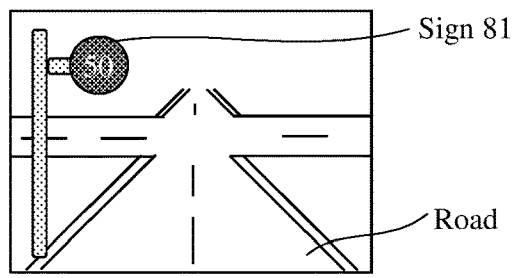
Sign information 82     Sign 81, Road
Fig. 8(A)        Fig. 8(B)
Map         Image N
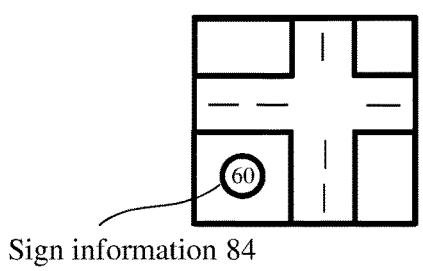 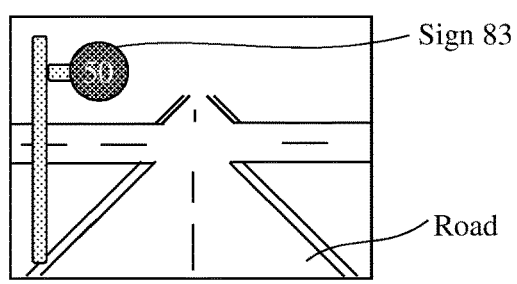
Sign information 84     Sign 83, Road
Fig. 8(C)        Fig. 8(D)
Map         Image N
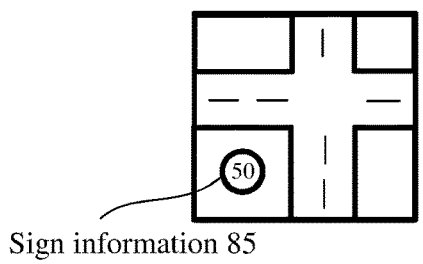 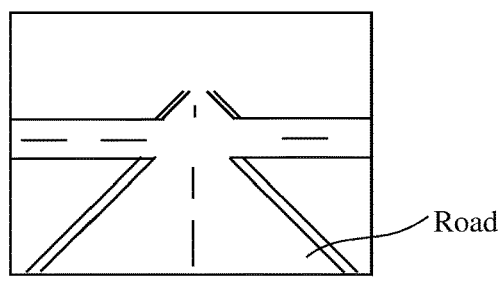
Sign information 85     Road
Fig. 8(E)        Fig. 8(F)
Map         Image N
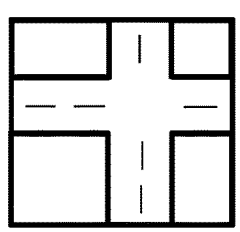 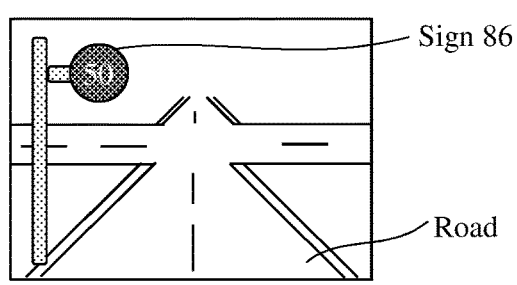
Sign 86, Road
Fig. 8(G)        Fig. 8(H)

IMAGE PROCESSING APPARATUS, IMAGE PROCESSING SYSTEM, AND IMAGE PROCESSING METHOD

BACKGROUND

The present invention relates to an image processing technique for detecting an object included in an image.

Recently, there is a growing need for rich content which reads information on a road sign, a store sign, or the like in an image captured by a smartphone, a drive recorder, or the like and which adds information on the type and position of the road sign or the store sign to map information. For example, an image or a video of a view from a vehicle is captured by a vehicle-mounted terminal such as a smartphone and a drive recorder, and a road accessory such as a sign is detected from the obtained image or from an image included in the obtained video. Subsequently, the vehicle-mounted terminal transmits information on the detected road accessory to a server at a center. The server confirms that the information on the road accessory has been correctly recognized and adds the information to map information.

WO 2006-101012 discloses a technique for detecting a road accessory from an image. With the technique described in WO 2006-101012, a road sign is recognized from an image captured by a camera installed inside a vehicle, information indicated by the recognized road sign is compared with map information and, when there is a difference between the two pieces of information, information of the difference is added to the map information. Road signs include primary signs which indicate a regulation, an instruction, a warning, guidance, and the like and auxiliary signs which supplement the meaning or content of primary signs.

SUMMARY

However, there are many types of signs installed on roads for the benefit of drivers and pedestrians and, accordingly, various types of signs may be present in an image photographed from a vehicle. In addition, such many types of signs include those that closely resemble each other. Therefore, it is not easy to specify a correct sign from a large number of likely signs. Furthermore, conditions under which photography is performed from a vehicle widely vary depending on a position where a sign is installed, the weather on the date of photography, the time of day during which photography is performed, and the like, resulting in a wide variation in brightness and shadowing in the photographed images. Therefore, actually performing image processing may cause a primary sign or an auxiliary sign in an image to be falsely recognized. As a result, it is difficult to accurately collect information on signs with these types of systems.

In addition, with a system in which a vehicle-mounted terminal transmits information on a recognized sign to a server and the server adds the received information on the sign to map information, the vehicle-mounted terminal may falsely recognize the sign. When the vehicle-mounted terminal falsely recognizes the sign and determines that there is a difference which, in reality, does not exist between the information on the sign and the map information, unnecessary communication occurs between the vehicle-mounted terminal and the server and an amount of data communication by the vehicle-mounted terminal increases.

An object of the present invention is to provide a technique for accurately recognizing an object from an image.

An image processing apparatus according to an aspect of the present invention includes:

a storage unit configured to store map information to which object information indicating an object and a position thereof is added, and a plurality of different classifiers for classifying an object in an image;

an object detecting unit configured to detect an object in a target image; and an object recognizing unit configured to select any of the classifiers based on a photographing position that is a position at which the target image has been photographed and the object information added to the map information and, using the selected classifier, recognize the object detected by the object detecting unit.

Further features related to the present invention will become apparent from the description of the present specification and from the accompanying drawings. In addition, aspects of the present invention are to be achieved and realized by elements, various combinations of elements, and aspects of the following detailed description and the appended claims.

It is to be understood that the description of the present specification merely represents typical examples and does not in any way limit the scope of the claims and examples of application of the present invention.

Since an object is detected from an image, a favorable classifier is selected based on information on the object and a position thereof added to map information, and the object is classified using the classifier, an object can be accurately recognized from an image.

BRIEF DESCRIPTION OF THE DRAWINGS

FIGS. 8A to 8H are diagrams for illustrating a process by an object recognizing unit 15 according to the first embodiment;

DETAILED DESCRIPTION OF THE EMBODIMENT

Figure 1:
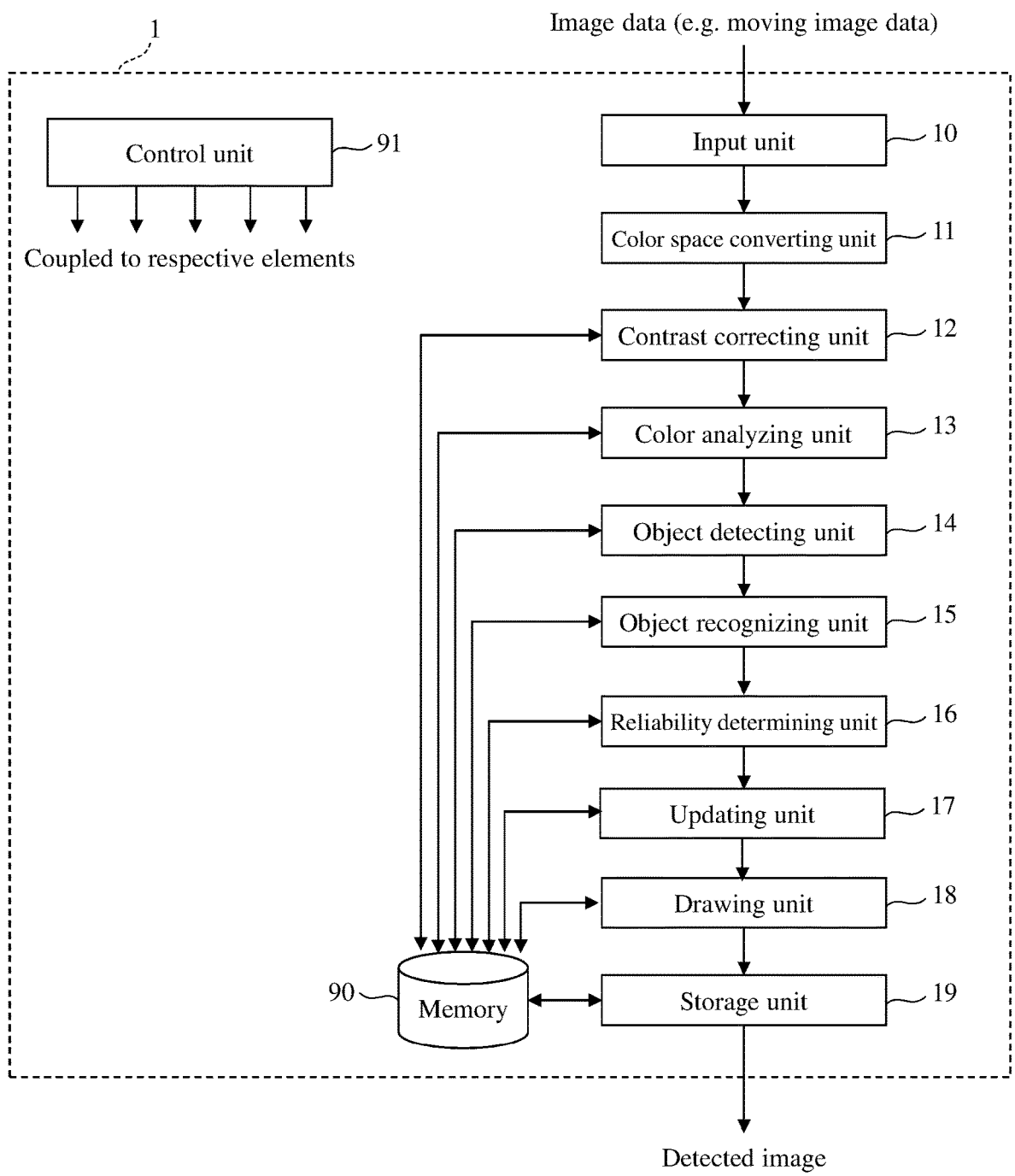
FIG. 1 is a block diagram showing a functional configuration of an image processing apparatus according to a first embodiment.

Generally, in order to detect road accessories as additional information of map information and the like, all routes must be traveled by vehicles to photograph the road accessories. This requires a high survey cost. In addition, road accessories on newly laid roads or roads having been modified due to construction cannot be reflected on map information in a timely manner.

In consideration thereof, the embodiments of the present invention described below enable road accessories to be detected from images photographed using vehicle-mounted terminals (for example, a smartphone, a drive recorder, and a car navigation apparatus) by a plurality of (many and unspecified) users and enable the detected road accessories to be reflected on map information in a timely manner.

Many types of signs may potentially appear in an image of a video photographed by a vehicle-mounted terminal. Signs are roughly divided into primary signs and auxiliary signs. Many primary signs indicate prescribed contents by a shape or a color of a pattern. Many auxiliary signs indicate prescribed information through characters and symbols. When faulty recognition of signs frequently occurs, there is a risk that information conveyed by the signs cannot be collected efficiently.

Some systems which recognize a sign and reflect the recognized sign on map information use a server to manage the map information. When a sign is recognized from an image photographed by a smartphone and a change occurs in the sign, new sign information is transmitted to the server, in which case the server updates map information based on the sign information received from the smartphone. As a result, a state is maintained where latest sign information is added to the map information. However, with this configuration, when faulty recognition of signs frequently occurs on a smartphone, a large number of pieces of differential information signifying a change in signs are created, communication through which the server is notified of sign information from the smartphone frequently occurs, and an amount of data communication increases. For example, while the use of the technique described in WO 2006-101012 enables many types of primary signs and auxiliary signs to be detected, since suppression of faulty recognitions is not taken into consideration, the fact that many types of signs are accommodated as recognition targets may potentially increase faulty recognitions and increase the amount of data communication between the smartphone and the server.

In consideration thereof, the embodiments of the present invention described below propose a technique which, when recognizing an object from an image photographed by a vehicle-mounted terminal, reduces faulty recognition by switching among classifiers to be used based on map information.

In addition, the embodiments of the present invention provide a technique which, even when brightness of an image in a video changes, separates a background in the image from an object in the background and improves accuracy of object detection.

Hereinafter, embodiments of the present invention will be described with reference to the accompanying drawings.

In the accompanying drawings, elements sharing a same function may be displayed using a same numeral. Moreover, while the accompanying drawings represent specific embodiments and implementations based on principles of the present invention, the embodiments and implementations are provided in order to facilitate understanding of the invention and are not intended to be used to limit interpretations of the invention in any way.

In addition, while the present embodiment is described in sufficient detail for those skilled in the art to implement the present invention, it is to be understood that other implementations and modes are possible and that the configurations and structures can be modified and the various elements can be replaced without departing from the scope and spirit of the technical ideas of the present invention. Therefore, the following description should not be interpreted as being limited thereto.

Furthermore, as will be described later, the embodiments of the present invention may be implemented as a software program running on a generic computer, as dedicated hardware, or as a combination of software and hardware.

Hereinafter, each process will be described using each processing unit (for example, a contrast correcting unit) realized by a software program as a subject (operating entity). Since the software program causes a prescribed process to be performed using a memory and a communication port (a communication control apparatus) by being executed by a processor (such as a CPU), a processor can also be used as a subject.

(1) First Embodiment

Functional Configuration of Image Processing Apparatus

FIG. 1 is a block diagram showing a functional configuration of an image processing apparatus according to a first embodiment. An image processing apparatus 1 includes an input unit 10, a color space converting unit 11, a contrast correcting unit 12, a color analyzing unit 13, an object detecting unit 14, an object recognizing unit 15, a reliability determining unit 16, an updating unit 17, a drawing unit 18, a storage unit 19, and a control unit 91.

The image processing apparatus 1 may be mounted inside a portable mobile terminal apparatus such as a smartphone as in the case of the first and second embodiments or may be mounted inside a server to be coupled to a portable mobile terminal apparatus via a network as in the case of third to fifth embodiments.

The input unit 10, the color space converting unit 11, the contrast correcting unit 12, the color analyzing unit 13, the object detecting unit 14, the object recognizing unit 15, the reliability determining unit 16, the updating unit 17, the drawing unit 18, and the storage unit 19 in the image processing apparatus 1 can be realized by a software program or realized as hardware modules.

The input unit 10 receives input of moving image data. For example, the input unit 10 may acquire encoded still image data or the like in a format such as JPG, JPEG2000, PNG, and BMP captured at prescribed time intervals by imaging means such as a drive recorder, and the image may be input to the input unit 10 as an input image. In addition, the input unit 10 may extract still image data of frames at prescribed intervals from moving image data in a format such as MotionJPEG, MPEG, H.264, and HD/SDI and use the extracted image as an input image. Furthermore, the input unit 10 may use an image acquired by imaging means via a bus, a network, or the like as an input image. Alternatively, the input unit 10 may use an image already stored in an attachable and detachable recording medium as an input image as will be described later.

The color space converting unit 11 acquires an RGB input image from the input unit 10 and converts a color space of the input image into Lab. The color space-modified image is supplied to the contrast correcting unit 12.

The contrast correcting unit 12 uses brightness information of a color of a previous image stored in a memory 90 and brightness information of a color of a current image to obtain a brightness variation of the color of the current image, and creates a contrast-corrected image using the brightness variation. As a result, the contrast of the corrected image is enhanced to enable an object to be more readily detected.

The color analyzing unit 13 analyzes a relationship among three primary colors of an input image, compares a difference value among the three primary colors with a threshold for color analysis in each pixel, and corrects the color of the pixel if the difference value is larger than the threshold. As a result, a color portion of the corrected image becomes clearer, thereby enabling an object to be more readily detected.

The object detecting unit 14 obtains, from an image after correction by the contrast correcting unit 12, a threshold for separating an object in the image from a background. In addition, the object detecting unit 14 uses the threshold to separate the background in the image from a region of an object in the background, and detects the region of an object in the background.

The object detecting unit 14 separates a region of an object constituting a rectangle from an image after correction by the color analyzing unit 13, and detects the region of the object in the background.

The object recognizing unit 15 switches among classifiers of objects in accordance with map information and classifies what object is detected by the object detecting unit 14. For example, signs come in various types. When classifying a sign, a classifier suitable for classification is prepared in accordance with the type of the sign. Sign information (object information) including information on a type and an installation position of a sign is added to map information. By referring to sign information added to map information, the object recognizing unit 15 can become informed of a sign assumed to be installed at a position of the object detected by the object detecting unit 14. As long as the sign remains unchanged, the object detected by the object detecting unit 14 should be the sign indicated by the sign information added to the map information. In addition, even when a change is made to the sign, the sign is relatively likely to be changed to a sign of a similar type. For example, at a position where a sign indicating a speed regulation had been installed, it is likely that a sign indicating a speed regulation with a different speed limit is to be installed. The classifier to be selected by the object recognizing unit 15 may be determined in consideration of such circumstances.

The reliability determining unit 16 calculates, based on a position indicated by a latitude and a longitude of an object detected and recognized from a plurality of images, a detection frequency of detection of the object at the position, and determines a reliability of the detected object based on the detection frequency.

The updating unit 17 acquires the detection frequency calculated by the reliability determining unit 16 for an object recognized by the object recognizing unit 15, acquires a detection frequency of an object registered as being present at the position from the server, and updates the map information when the former detection frequency is higher than the latter detection frequency.

With respect to an image in which an object is recognized by the object recognizing unit 15, the drawing unit 18 draws a frame (a detection frame) enclosing the recognized object onto the image.

The storage unit 19 stores data of an image drawn a detection frame on an original image obtained as a result of the drawing unit 18 in the memory 90.

The control unit 91 is realized as a processor executes a software program and is coupled to the respective units in the image processing apparatus 1 or, in other words, the input unit 10, the color space converting unit 11, the contrast correcting unit 12, the color analyzing unit 13, the object detecting unit 14, the object recognizing unit 15, the reliability determining unit 16, the updating unit 17, the drawing unit 18, and the storage unit 19. An operation by each unit of the image processing apparatus 1 is an autonomous operation of each unit described above or an operation according to an instruction from the control unit 91.

As described above, in the image processing apparatus 1 according to the present embodiment, using an image after color space conversion obtained by the color space converting unit 11 and an amount of variation of brightness (brightness of color) of the image calculated by the contrast correcting unit 12, a contrast-corrected image is created by changing a contrast enhancement rate of the image for each image and a color-masked image is created by analyzing a difference value of primary colors by the color analyzing unit 13. In addition, a threshold is obtained from the image after contrast correction by the object detecting unit 14, a background in an image is separated from a region of an object in the background using the threshold, and the region of the object in the background is detected. Furthermore, a region of an object constituting a rectangle is separated from a color-masked image by the color analyzing unit 13, and the region of the object in the background is detected. Moreover, due to a process of recognizing an object while switching among classifiers using map information by the object recognizing unit 15, an object in an image is recognized. When a detection frequency of the recognized object is high, map information is updated by the updating unit 17.

Hardware Configuration of Image Processing Apparatus

Figure 2:
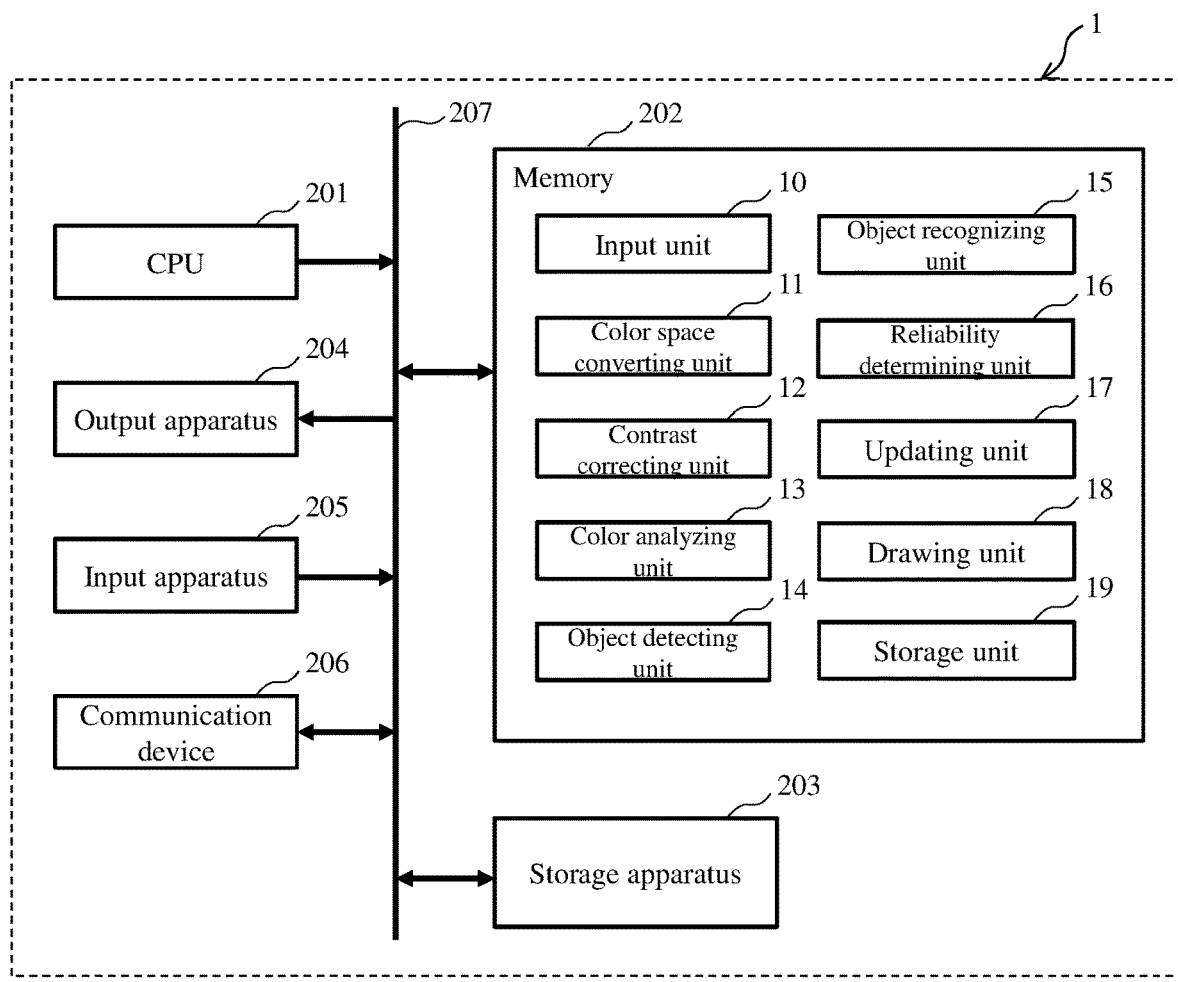
FIG. 2 is a diagram showing an example of a hardware configuration of an image processing apparatus 1 according to the first embodiment.

FIG. 2 is a diagram showing an example of a hardware configuration of the image processing apparatus 1 according to the first embodiment.

The image processing apparatus 1 includes a CPU (a processor) 201 which executes various programs, a memory 202 which stores the various programs, a storage apparatus (which corresponds to the memory 90) 203 which stores various data, an output apparatus 204 for outputting a detected image, an input apparatus 205 used by a user to input an instruction, an image, and the like, and a communication device 206 for communicating with other apparatuses, and a bus 207 connects these components with each other.

The CPU 201 reads various programs from the memory 202 as necessary and executes the programs.

The memory 202 stores software programs that respectively realize the input unit 10, the color space converting unit 11, the contrast correcting unit 12, the color analyzing unit 13, the object detecting unit 14, the object recognizing unit 15, the reliability determining unit 16, the updating unit 17, the drawing unit 18, and the storage unit 19.

The storage apparatus 203 stores previous images (images up to an image N-1 to be described later) having been photographed before a target image (an image N to be described later) on which a process of detecting and recognizing an object is to be performed, respective pixel values of images generated by the contrast correcting unit 12, a calculated threshold of each image, and the like.

The output apparatus 204 is a device such as a display, a printer, and a speaker. For example, the output apparatus 204 displays an image of data generated by the drawing unit 18 on a display screen.

The input apparatus 205 is a device such as a keyboard, a mouse, and a microphone. The input apparatus 205 is used to input, for example, instructions (including a determination of a processing target image) by the user to the image processing apparatus 1.

The communication device 206 is a device which performs data communication via a network and, for example, performs operations involving receiving data (including an image) transmitted from other apparatuses (such as a server) coupled to a network and storing the data in the storage apparatus 203. The communication device 206 is not an essential component of the image processing apparatus 1 and, when a communication device is included in a portable mobile terminal, the image processing apparatus 1 need not retain the communication device 206.

Moreover, while an example of an information processing apparatus including the CPU 201, the memory 202, the storage apparatus 203, and the like has been described as a hardware configuration of the image processing apparatus 1 according to the present embodiment, the present invention is not limited thereto. A part of or all of the color space converting unit 11, the contrast correcting unit 12, the color analyzing unit 13, the object detecting unit 14, the object recognizing unit 15, the reliability determining unit 16, the updating unit 17, and the drawing unit 18 may be constituted by dedicated hardware.

Configuration and Operation of Each Unit

Hereinafter, a configuration and an operation of each unit of the image processing apparatus 1 will be described in detail.

(i) Color Space Converting Unit 11

The color space converting unit 11 generates, for example, an image in which an RGB color space of an input image is converted into a Lab color space. Due to the Lab color space conversion, an L value, an a value, and a b value of the input image are acquired. The L value is information such as lightness and the a value and the b value are color information.

(ii) Contrast Correcting Unit 12

Figure 3:
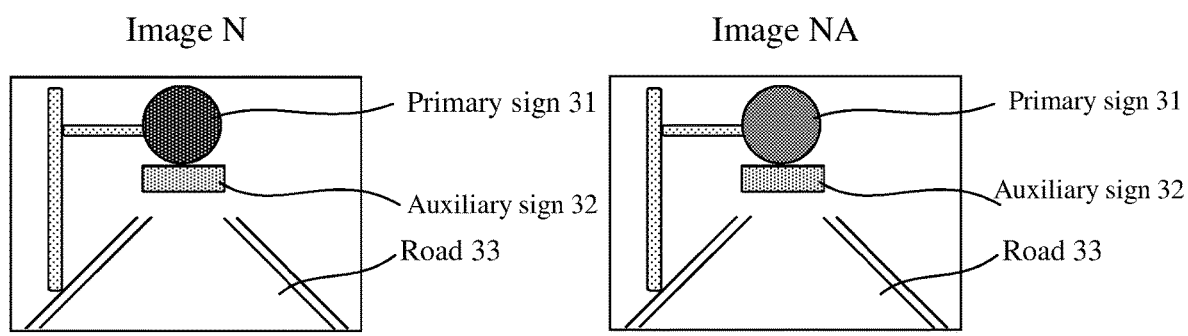
FIG. 3 is a diagram for illustrating an example of an operation by a contrast correcting unit 12.
Figure 4:
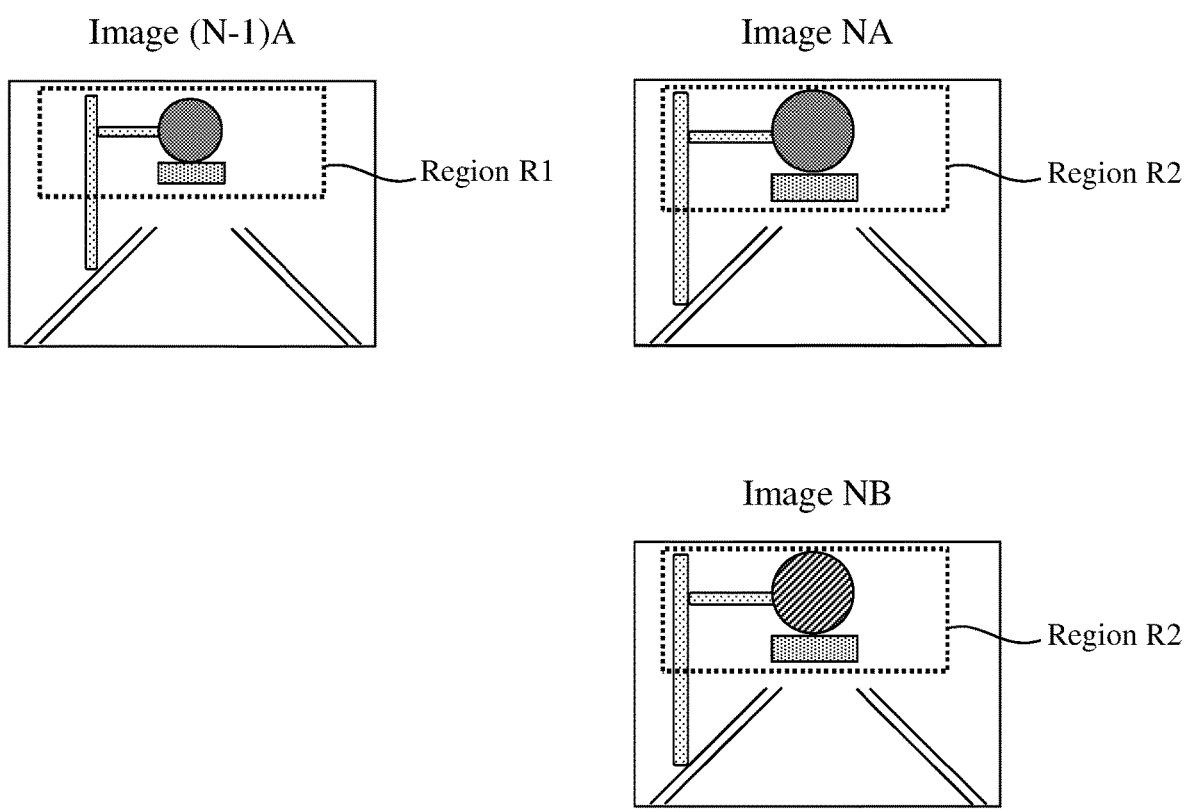
FIG. 4 is a diagram for illustrating an example of an operation by the contrast correcting unit 12.

FIG. 3 is a diagram for illustrating an example of an operation by the contrast correcting unit 12. Let an image NA denote an image obtained by the color space converting unit 11 after conversion of an image N into a Lab color space. Using color information (an a value or a b value) of the image NA, as shown in FIG. 4, the contrast correcting unit 12 calculates an average value aveR2 of color information (brightness of color: an a value or a b value) in a region R2 of the image NA. In addition, the contrast correcting unit 12 reads an average value aveR1 of brightness of color in a region R1 of an image N-1 from the memory 90 (which corresponds to the storage apparatus 203). The image N-1 is an image immediately preceding the image N.

Next, using expression 1 below, the contrast correcting unit 12 calculates an average value aveRN which blends aveR1 which blends average values of brightness (an a value or a b value) of a color of previous images up to the image N-1 with the average value aveR2 of brightness of color of the image N.

[Math. 1]

$$aveRN = aveR1 \times \frac{C2}{C1} + aveR2 \times \frac{C3}{C1} \quad \text{(Expression 1)}$$

Note that, in expression 1, C1=C2+C3. When desiring to moderate a change in the brightness of color in a corrected image from a previous image, a weight C2 of the previous image may be increased. Conversely, when desiring to cause the brightness of color in the corrected image to change dramatically toward a current image (a present image), a weight C3 of the present image may be increased. However, increasing C3 to such an extent that the present image becomes overemphasized may prevent contrast from being accurately corrected. Therefore, the previous image must also be considered to a certain degree. In other words, C2 should not be excessively reduced. When desiring to moderate a change in the brightness of color in the corrected image from a previous image, for example, C2 may conceivably be set to 0.9 and C3 to 0.1. In addition, when desiring to cause the brightness of color in the corrected image to change dramatically toward the present image, for example, C2 and C3 may conceivably be set to 0.5.

In addition, the contrast correcting unit 12 calculates a magnification value v using expression 2 below. The magnification value v is a value indicating to what degree contrast is to be enhanced.

[Math. 2]

$$v = \frac{E2}{E1} \quad \text{(Expression 2)}$$

Note that, in expression 2, when the value of aveR1 is equal to or larger than the value of aveR2, E1 is set to aveR2 and E2 is set to aveR1. When the value of aveR1 is smaller than the value of aveR2, E1 is set to aveR1 and E2 is set to aveR2. Alternatively, the magnification value v may be a fixed value.

Furthermore, using expression 3 below, the contrast correcting unit 12 corrects the image NA so that pixels that are darker than an average value of brightness of the color in the region R2 of the image NA become darker and pixels that are lighter than the average value of brightness of the color in the region R2 of the image NA become lighter.

[Math. 3]

$$cnCor = cn - (aveR2 - cn) \times v \quad \text{(Expression 3)}$$

Performing such a correction enables an object that is buried in the background and is hardly visible in an input image to be readily detected. Note that, in expression 3, cn denotes an a value or a b value of each pixel in the image NA. The region R2 is a region in which an object to be a target of detection and recognition is likely to be present. For example, when making a road sign a target, an upper part of an image may be set as the region R2 in consideration of a height of the road sign.

The contrast correcting unit 12 obtains a corrected pixel value cnCor for each pixel and creates a contrast-corrected image NB of the image NA.

(iii) Color Analyzing Unit 13

Figure 5:
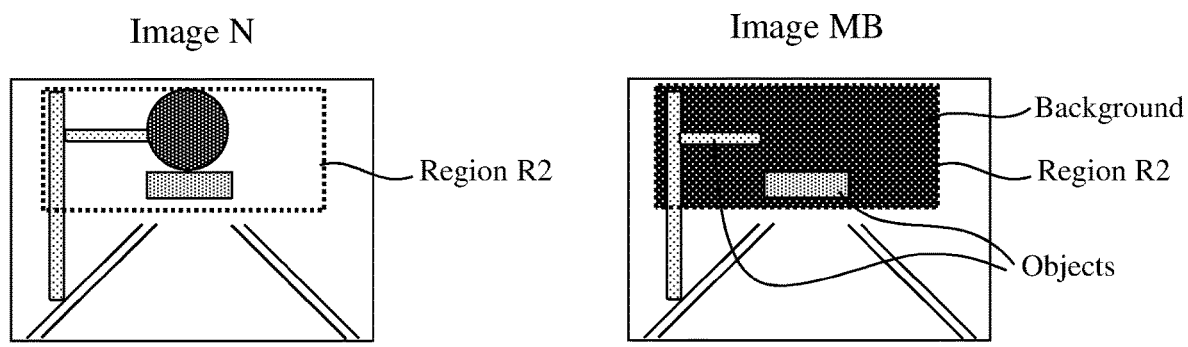
FIG. 5 is a diagram for illustrating an example of an operation by a color analyzing unit 13.

FIG. 5 is a diagram for illustrating an example of an operation by the color analyzing unit 13. For R (Red), G (Green), and B (Blue) which are the three primary colors, the color analyzing unit 13 obtains absolute values s_R, s_G, and s_B of differences among the respective primary colors using expression 4 below. A color-masked image MB is created by setting a pixel value of an original image when the respective values s_R, s_G, and s_B are all equal to or smaller than a threshold Th_s (for example, Th_s=30) but setting all values of R, G, and B to 0 when any one of s_R, s_G, and s_B exceeds the threshold Th_s. Note that, in expression 4, abs denotes an absolute value.

[Math. 4]

$$\left.\begin{array}{l} s\_R = abs(R - G) \\ s\_G = abs(G - B) \\ s\_B = abs(B - R) \end{array}\right\} \quad \text{(Expression 4)}$$

(iv) Object Detecting Unit 14

The object detecting unit 14 obtains a threshold Th for each image using expression 5 below.

[Math. 5]

$$Th = aveRN + \alpha \quad \text{(Expression 5)}$$

Note that, in expression 5, aveRN denotes an average value which is obtained according to expression 1 and which blends aveR1 which blends average values of brightness of color of previous images up to the image N-1 with the average value aveR2 of brightness of color of the image N. $\alpha$ is a parameter for adjusting the threshold to above or below the average value aveRN. $\alpha$ may be set to a positive value when desiring to extract only pixels that are brighter than in a case where the average value aveRN is used as the threshold Th. $\alpha$ may be set to a negative value when desiring to extract only pixels that are darker than in a case where the average value aveRN is used as the threshold Th. Adjusting the value of $\alpha$ enables a target object to be more readily segmented.

When a pixel of the image NA is an a value, the object detecting unit 14 obtains the threshold Th for each image by setting a to a positive value. Subsequently, the object detecting unit 14 compares a pixel value with the threshold Th, sets the pixel value to an s value (for example, s=255) for pixels of which the pixel value ≥Th, and sets the pixel value to a t value (for example, t=0) for pixels of which the pixel value <Th. Accordingly, an image in which the background is clearly separated from the object is created. As a result, brighter objects (mainly red and yellow objects) can be separated in an efficient manner.

On the other hand, when each pixel of the image NA is a b value, the object detecting unit 14 obtains the threshold Th for each image by setting a to a negative value. Subsequently, the object detecting unit 14 sets the pixel value to an s value (for example, s=255) for pixels of which the pixel value ≤Th, and sets the pixel value to a t value (for example, t=0) for pixels of which the pixel value >Th. Accordingly, an image in which the background is clearly separated from the object is created. As a result, darker objects (mainly blue and green objects) can be separated in an efficient manner.

Figure 6:
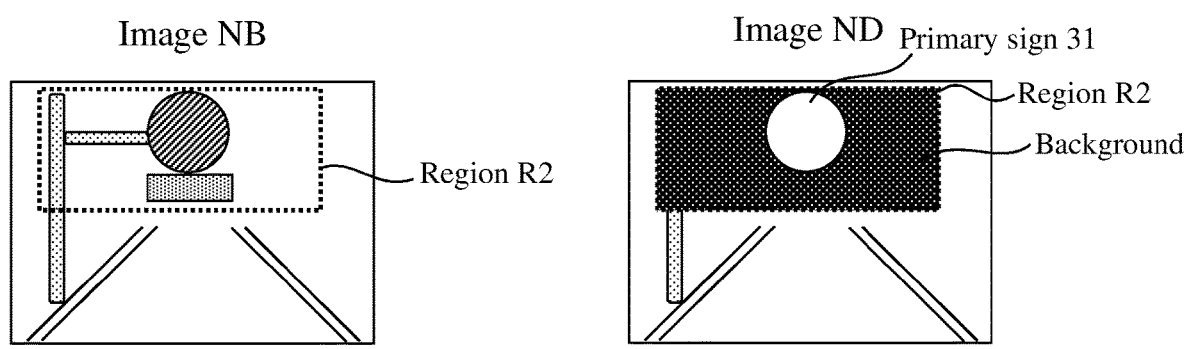
FIG. 6 is a diagram for illustrating an example of an operation by an object detecting unit 14.

Therefore, due to the process of the object detecting unit 14, for example, the region R2 of the image NB shown in FIG. 6 becomes separable after the process of the object detecting unit 14 is performed into a background and an object (e.g. a primary sign 31) as shown in an image ND. An object detected in the region R2 includes many candidates of a primary sign.

In addition, due to the process of the color analyzing unit 13, the object detecting unit 14 obtains a rectangle from the region R2 of the image MB and creates an image in which a background is separated from a region of an object. For example, when the process of the object detecting unit 14 is performed with respect to the region R2 of the image MB shown in FIG. 7, the region R2 becomes separable into a background and an object (e.g. an auxiliary sign 32) as shown in an image MC. An object detected in the region R2 includes many candidates of an auxiliary sign.

(v) Object Recognizing Unit 15

The object recognizing unit 15 switches among classifiers of signs in accordance with sign information added to map information and executes a process of classifying what sign (a primary sign, an auxiliary sign, and the like) is an object detected by the object detecting unit 14. In this case, for example, the object recognizing unit 15 creates a classifier from feature amounts of images by machine learning using a known neural network, and classifies the detected object using the classifier.

For example, for each sign, two types of classifiers including a classifier A which classifies signs into three classes and a classifier B which classifies signs into N-number of classes are created in advance. For example, when a determination value is 0, the classifier A indicates that an object is other than a sign. When a determination value is 1, the classifier A indicates that the object is a target sign. When a determination value is 2, the classifier A indicates that the object is sign other than the target sign.

In addition, for example, when a determination value is 0, the classifier B indicates that an object is other than a sign. When a determination value is 1, the classifier B indicates that the object is a "stop" sign. In a similar manner, the classifier B indicates various signs depending on the determination value, and indicates that the object is a "no vehicle entry" sign when the determination value is N. In this case, N denotes the number of signs to be classified.

FIGS. 8A to 8H are diagrams for illustrating a process by the object recognizing unit 15 according to the first embodiment. In FIGS. 8A, 8C, 8E, and 8G indicate sign information added to map information. FIGS. 8B, 8D, 8F, and 8H represent target images for recognizing signs.

As shown in FIG. 8A, when sign information 82 of a map is a speed regulation sign with a speed limit of 50, the 3-class classifier A which classifies a speed regulation sign with a speed limit of 50 as a target sign is selected and a sign 81 of an object detected by the object detecting unit 14 shown in FIG. 8B is classified using the 3-class classifier A.

When a determination result of the classifier A is 0, since the sign 81 is determined as an object that is not a sign, the smartphone mounted with the image processing apparatus 1 does not transmit sign information of the sign 81 to the server. In addition, when the determination result of the classifier A is 1, the sign 81 is the same as the sign indicated by the sign information added to the map information. Since the server has already been informed of the sign 81, the sign information of the sign 81 is not transmitted from the smartphone to the server.

In addition, as shown in FIGS. 8C and 8D, when sign information 84 of the map is a speed regulation sign with a speed limit of 60 and a sign 83 in the image is a speed regulation sign with a speed limit of 50, a determination result of the classifier A is 2. Since there is a likelihood that the sign installed on site has been changed, the smartphone transmits the image and positional information of the sign 83 to the server.

Furthermore, as shown in FIGS. 8E and 8F, when sign information 85 on the map is a speed regulation sign with a speed limit of 50 and an object is not detected in the image, since there is a likelihood that a sign of sign information 85 has been removed, the smartphone transmits information describing the absence of the sign of the sign information 85 and positional information to the server.

Moreover, since sign information is absent from the map in the case of FIG. 8G, a classifier that accommodates a specific sign as a target sign cannot be used. Therefore, in this case, a sign 86 in an image N shown in FIG. 8H is classified using the N-class classifier B. Since the sign 86 is likely to be some kind of sign when the determination result of the classifier B is other than 0, the smartphone transmits an image and positional information of the sign 86 to the server. When the determination result is 0, since it is highly likely that the sign 86 is an object other than a sign, the smartphone does not transmit anything to the server. Due to the process described above, a determination of whether or not an object detected by the object detecting unit 14 is a sign to be classified such as a primary sign and an auxiliary sign can be made with high accuracy. However, sign information of a map is switched together with map information in accordance with travel of a vehicle.

Moreover, while a configuration is adopted in which, when sign information is absent from map information, a sign is classified using an N-class classifier, this configuration is not restrictive.

As another example, when a sign has already been recognized by another terminal mounted with the image processing apparatus 1, the other terminal may notify the server of information on the recognized sign and a position thereof and the server may distribute the information to terminals coupled to the server. Subsequently, a terminal having received the information may select a classifier based on the information.

As yet another example, when sign information is absent from map information, an object may be recognized by sequentially switching among 3-class (or 2-class) classifiers such as that used in the present embodiment and selecting an object with a highest likelihood.

In addition, in doing so, processes using all of or a part of the 3-class (or 2-class) classifiers may be performed in parallel.

(vi) Reliability Determining Unit 16

Figure 9:
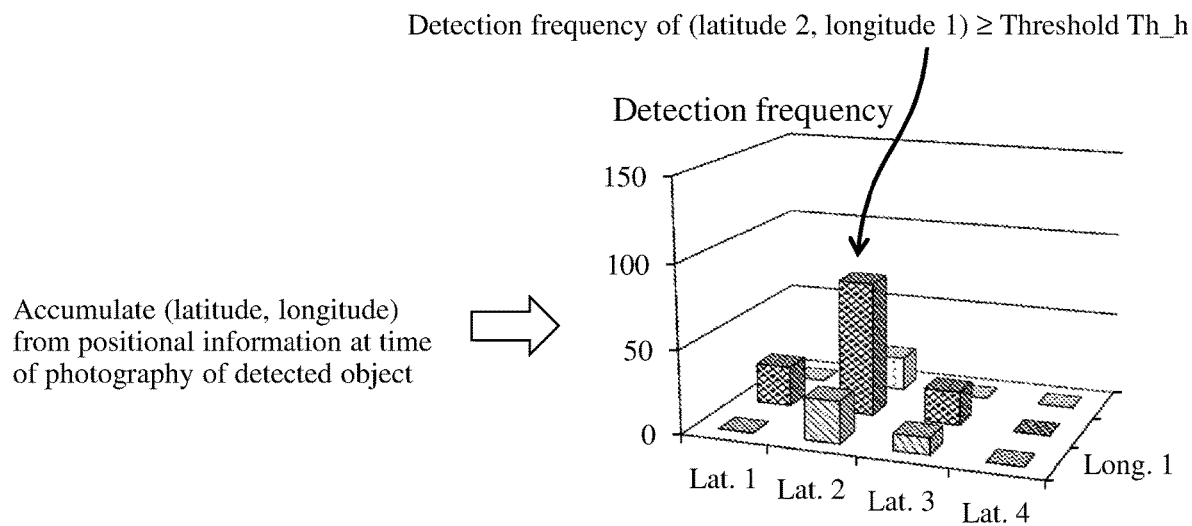
FIG. 9 is a diagram for illustrating an example of an operation by a reliability determining unit 16.

As shown in FIG. 9, the reliability determining unit 16 obtains a latitude and a longitude from positional information at the time of photography of a detected object, accumulates a detection frequency of the position, and stores the accumulated detection frequency in the memory 90 (which corresponds to the storage apparatus 203). Moreover, the position of an object can be calculated based on positional information and information on an orientation of the smartphone at the time of photography and on a distance from the smartphone to the object as estimated from an image.

For each sign type, detection results by a plurality of users or results of a plurality of detections by a same user are accumulated. In addition, the reliability determining unit 16 compares the accumulated detection frequency with a threshold Th_h set in advance and, when the detection frequency is equal to or higher than the threshold Th_h, the reliability determining unit 16 determines that a reliability C of (the latitude and the longitude) of the detected object is high. Reliability is determined in this manner because, due to differences in movement speed and photographing position (height and travel position on a road) among mobile objects (for example, automobiles) to be photographed, there may be minute differences in measured latitude and longitude.

(vii) Updating Unit 17

The updating unit 17 compares a detection frequency B1 of a sign B obtained by the reliability determining unit 16 with a detection frequency A1 received from the server of a sign A at a same position as the sign B, and updates map information as necessary. In other words, when the sign A and the sign B are the same sign, the updating unit 17 does not update map information. When the sign A and the sign B are different signs and the detection frequency B1 exceeds the detection frequency A1 (where A1 is equal to or higher than Th_h), the updating unit 17 changes the sign A on the map to the sign B. Even when the sign A and the sign B are different signs, when the detection frequency B1 does not exceed the detection frequency A1, the updating unit 17 does not update map information. When the detection frequency A1 is lower than Th_h and the detection frequency B1 is equal to or higher than a threshold Th_B1, the updating unit 17 changes the sign A on the map to the sign B. When the detection frequency A1 is lower than Th_h and the detection frequency B1 is also lower than the threshold Th_B1, the updating unit 17 does not update map information.

(viii) Drawing Unit 18

Figure 10:
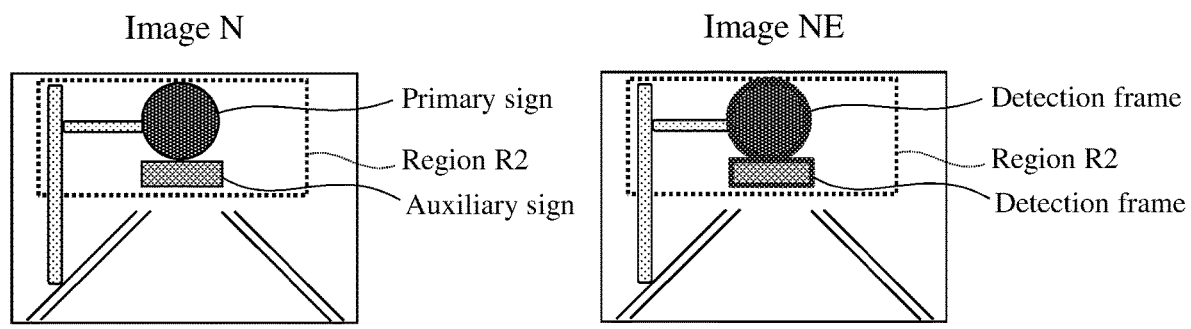
FIG. 10 is a diagram for illustrating an example of an operation by a drawing unit 18.

When it is determined that the reliability C of the object recognized by the object recognizing unit 15 is higher than a prescribed value, as shown in FIG. 10, the drawing unit 18 draws a detection frame (refer to image NE) so as to enclose the object on the image N shown in FIG. 3. On the other hand, when it is determined that the reliability C of the object is low or, in other words, when the detection frequency has not reached the threshold Th_h, the drawing unit 18 does not draw the detection frame described above on the image N.

(ix) Storage Unit 19

The storage unit 19 stores data of an image obtained as a result of the drawing unit 18 drawing a detection frame on the original image N in the memory 90.

Processing Procedure of Image Processing Apparatus

Figure 11:
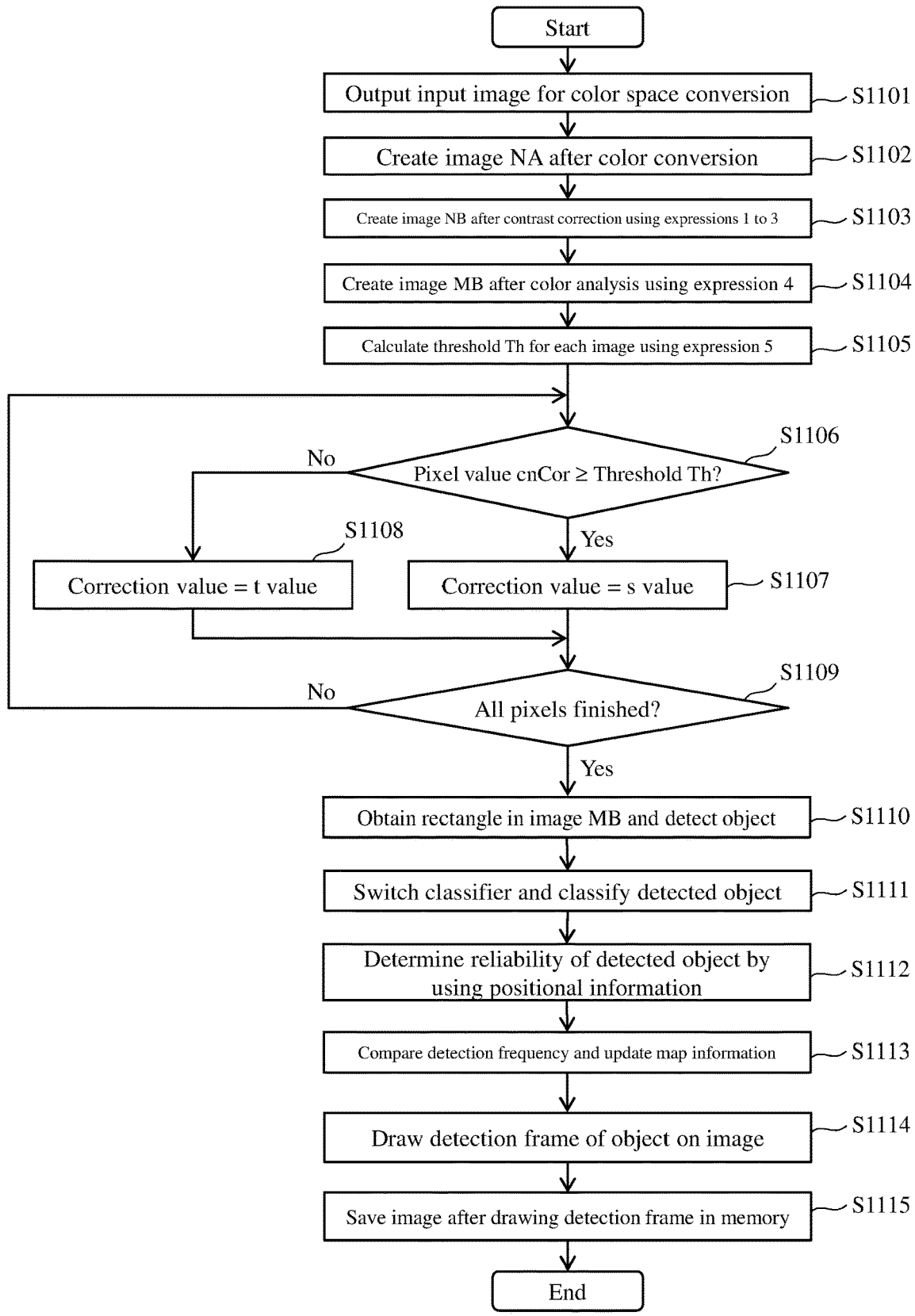
FIG. 11 is a flow chart showing an example of an operation by the image processing apparatus 1 according to the first embodiment.

FIG. 11 is a flow chart showing an example of an operation by the image processing apparatus 1 according to the first embodiment. Although the following description will be given with the respective processing units such as the input unit 10 and the color space converting unit 11 as operating entities, the description may be paraphrased so that the CPU 201 is an operating entity that executes the respective processing units which are programs.

(i) Step 1101

The input unit 10 accepts an input image and outputs the input image to the color space converting unit 11.

(ii) Step 1102

The color space converting unit 11 obtains an image NA by converting the input image N output from the input unit 10 or, in other words, an RGB color space image into, for example, a Lab color space image.

(iii) Step 1103

The contrast correcting unit 12 calculates an average value aveR2 of brightness of color in a region R2 of the image NA obtained by the color space converting unit 11. In addition, the contrast correcting unit 12 reads an average value aveR1 of brightness of color in a region R1 of an image N-1 (a temporally immediately previous image) from the memory 90. Subsequently, the contrast correcting unit 12 generates a contrast-corrected image NB using expressions 1 to 3 described earlier.

(iv) Step 1104

The color analyzing unit 13 obtains absolute values s_R, s_G, and s_B of differences among the respective three primary colors using expression 4 described earlier, and creates a color-masked image MB by comparing the values with a threshold Th_s. For example, the region R2 of the image N shown in FIG. 5 becomes separable into a background and an object as indicated in the image MB after color analysis shown in FIG. 5.

(v) Step 1105

The object detecting unit 14 obtains a threshold Th for each image using expression 5 described earlier.

(vi) Step 1106

The object detecting unit 14 compares each pixel value cnCor of the contrast-corrected image NB with the threshold Th. In other words, when each pixel of the image NB is an a value and cnCor≥threshold Th, the process migrates to step 1107. On the other hand, when cnCor<threshold Th, the process migrates to step 1108. Moreover, when each pixel of the image NB is a b value and cnCor≤threshold Th, the object detecting unit 14 migrates to step 1107. On the other hand, when cnCor>threshold Th, the object detecting unit 14 migrates to step 1108.

(vii) Step 1107

Regardless of whether each pixel of the image NB is the a value or the b value, the object detecting unit 14 sets a correction value to an s value (for example, 255).

(viii) Step 1108

Regardless of whether each pixel of the image NB is the a value or the b value, the object detecting unit 14 sets a correction value to a t value (for example, 0).

(ix) Step 1109

The object detecting unit 14 repeats steps 1106 to 1108 described above until a correction value is obtained for all pixels in a target image. By repeating steps 1106 to 1108, for example, the region R2 of the image NB shown in FIG. 6 becomes separable into a background and an object (e.g. a primary sign 31) shown in an image ND after object detection.

(x) Step 1110

Figure 7:
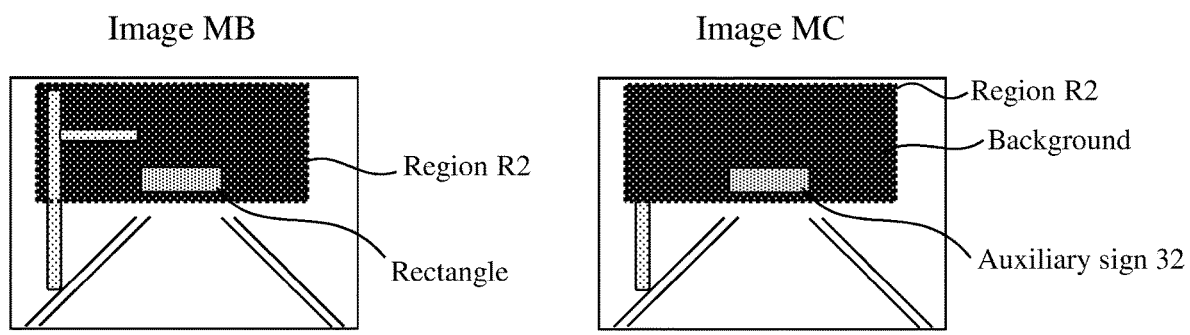
FIG. 7 is a diagram for illustrating an example of an operation by the object detecting unit 14.

The object detecting unit 14 obtains a region of an object constituting a rectangle from the region R2 of the image MB and detects an object (for example, the auxiliary sign 32) shown in an image MC in FIG. 7.

(xi) Step 1111

The object recognizing unit 15 reads the classifier A and the N-class classifier B for each sign from the memory 90 (the storage apparatus 203), switches between the classifiers in accordance with map information, and classifies what sign an image of the object detected by the object detecting unit 14 corresponds to or whether the image corresponds to something other than a sign using the switched classifier.

(xii) Step 1112

The reliability determining unit 16 accumulates positional information (latitude and longitude) at the time of photography of the detected object and, when an accumulated detection frequency is equal to or higher than the threshold Th_h, the reliability determining unit 16 determines that the reliability C of the (latitude and longitude) of the detected object is high. On the other hand, the reliability C is determined to be low when the detection frequency is lower than the threshold Th_h. A reliability determination is performed for each object detected by the object detecting unit 14.

(xiii) Step 1113

The updating unit 17 does not update map information when the sign A and the sign B are the same sign. In addition, when the sign A and the sign B are different signs and the detection frequency B1 of the sign B exceeds the detection frequency A1 (where A1 is equal to or higher than Th_h) of the sign A, the updating unit 17 changes the sign A on the map to the sign B, but when the detection frequency B1 does not exceed the detection frequency A1, the updating unit 17 does not update map information. Alternatively, when the detection frequency A1 is lower than Th_h and the detection frequency B1 is equal to or higher than a threshold Th_B1, the updating unit 17 changes the sign A on the map to the sign B, but when the detection frequency A1 is lower than Th_h and the detection frequency B1 is also lower than the threshold Th_B1, the updating unit 17 does not update map information.

(xiv) Step 1114

When the reliability C of a sign that is an object is high, the drawing unit 18 draws a detection frame on the input image N so as to enclose the object recognized by the object recognizing unit 15. When the reliability C of the sign is low, the drawing unit 18 does not draw a detection frame on the input image N.

(xv) Step 1115

The storage unit 19 stores data of an image on which a detection frame of an object has been drawn in the memory 90 (which corresponds to the storage apparatus 203).

As described above, according to the present embodiment, using an average value aveR1 which blends average values of brightness of color of previous images up to an image N-1 and an average value aveR2 of brightness of color of an image N that is a processing target, an image NB is created in which contrast of the input image N is corrected, and a threshold Th is obtained for each image NB. Therefore, using the threshold Th, a background and an object in the background in the input image N can be separated from each other.

In addition, with respect to the three primary colors of R, G, and B, absolute values s_R, s_G, and s_B of differences between any two of the three primary colors are calculated to create a color-masked image MB and a rectangle in the image MB is obtained. Therefore, a background and an object in the background in the image N can be separated from each other.

Furthermore, the image processing apparatus 1 switches among classifiers of a sign in accordance with map information and classifies a detected object. Therefore, an object can be accurately classified.

In addition, by accumulating positional information of a detected object and determining a detection frequency, positional information of each detected object can be more accurately obtained.

Furthermore, map information is updated by comparing a detection frequency of a sign obtained by a smartphone with detection frequency of a sign received from a server. Therefore, sign information with higher accuracy can be created.

In addition, by having a server distribute application software of a smartphone which implements the respective processing units of the image processing apparatus 1 according to the present embodiment and having a smartphone implement the respective processing units of the image processing apparatus 1 included in the application software, an object in an image can be separated and the object can be accurately classified.

As described above, by using brightness information of a previous image and a target image to create an image in which contrast of the target image is enhanced and obtaining a threshold for separating a region in an image for each image, even when brightness of an image in a video changes depending on a direction of travel of a moving vehicle, a background in the image can be separated from an object in the background and the object in the background can be detected. In addition, together with more accurate positional information, by detecting an object from an image and switching among classifiers in accordance with map information, the detected object can be accurately classified. Furthermore, by comparing two detection frequencies, map information can be updated more accurately. Moreover, by detecting objects from videos of vehicle-mounted smartphones photographed by many and unspecified users and obtaining more accurate positions from a detection frequency of positional information, road accessories on a newly laid road or a road having been modified due to road construction can be detected in a timely manner.

(2) Second Embodiment

Figure 12:
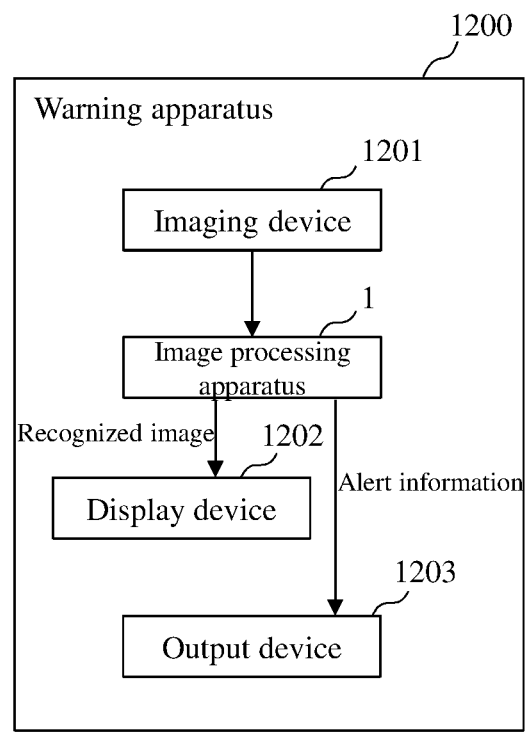
FIG. 12 is a functional block diagram showing a configuration of a warning apparatus 1200 according to a second embodiment.

FIG. 12 is a functional block diagram showing a configuration of a warning apparatus 1200 according to the second embodiment. For example, as a navigation system, the warning apparatus 1200 guides a user along a route to a destination on a map, gathers information on target objects such as signs from the user in real time, and outputs a warning (an alert) when the user approaches a location of a prescribed mark. The output of the warning is performed by, for example, a display on a screen or by voice.

In this case, for example, the prescribed mark may be a predetermined location or a location marked by the user during a previous travel of a vehicle. Conceivable examples of a predetermined location include general-purpose buildings such as a city hall and a police station and landmark-type buildings. The warning apparatus 1200 according to the second embodiment provides the user with beneficial information while gathering (extracting) information from the user.

The warning apparatus 1200 is, for example, an apparatus such as a smartphone and, as shown in FIG. 12, includes an imaging device 1201 which photographs image data, an image processing apparatus 1 which recognizes an image including a detection target from the image data, a display device 1202 which displays a recognized image output from the image processing apparatus 1, and an output device 1203 which outputs alert information output from the image processing apparatus 1. In this case, the imaging device 1201 may be constituted by a CMOS sensor, a CCD camera, or the like. The image processing apparatus 1 corresponds to the image processing apparatus 1 described in the first embodiment.

The image processing apparatus 1 recognizes an object such as a road accessory from data of an image photographed by the imaging device 1201. In addition, while switching among classifiers for recognizing primary signs such as a speed sign and auxiliary signs in accordance with map information, the image processing apparatus 1 recognizes a primary sign and an auxiliary sign from the image data.

The display device 1202 displays a recognized image of a speed sign, an auxiliary sign, and the like output from the image processing apparatus 1 on a display screen (not shown) of the warning apparatus 1200 (for example, a smartphone).

The output device 1203 outputs alert information output from the image processing apparatus 1 from a speaker of the warning apparatus 1200 or displays the alert information on the display screen of the warning apparatus 1200.

Furthermore, the warning apparatus 1200 according to the present embodiment may be configured to record data of an image (a detected image or a recognized image) at a point where an alert is issued.

There are various conceivable ways to notify alert information.

For example, when contents of a detected object matches an object indicated by object information added to map information, the warning apparatus 1200 notifies the user of the map information.

In addition, when contents of a detected object do not match map information in one detection, the warning apparatus 1200 does not yet notify the user of alert information at that point. Furthermore, when an object could not be detected a plurality of times at a same point but map information includes information on the object, since there is a likelihood that a sign at that point has been changed, the warning apparatus 1200 notifies the user of a message such as "Please check sign" in order to prompt the user to check the sign.

Moreover, the user may be notified of information of a detected primary sign and information of a detected auxiliary sign in combination, or the user may be notified of the information of the primary sign and the information of the auxiliary sign may be separately.

The warning apparatus 1200 according to the second embodiment can be implemented to, for example, execute an application on a smartphone. Accordingly, a vehicle-mounted smartphone can recognize a primary sign such as a speed sign and an auxiliary sign from a photographed video and notify the user of a recognized image of the primary sign and the auxiliary sign together with alert information.

(3) Third Embodiment

Figure 13:
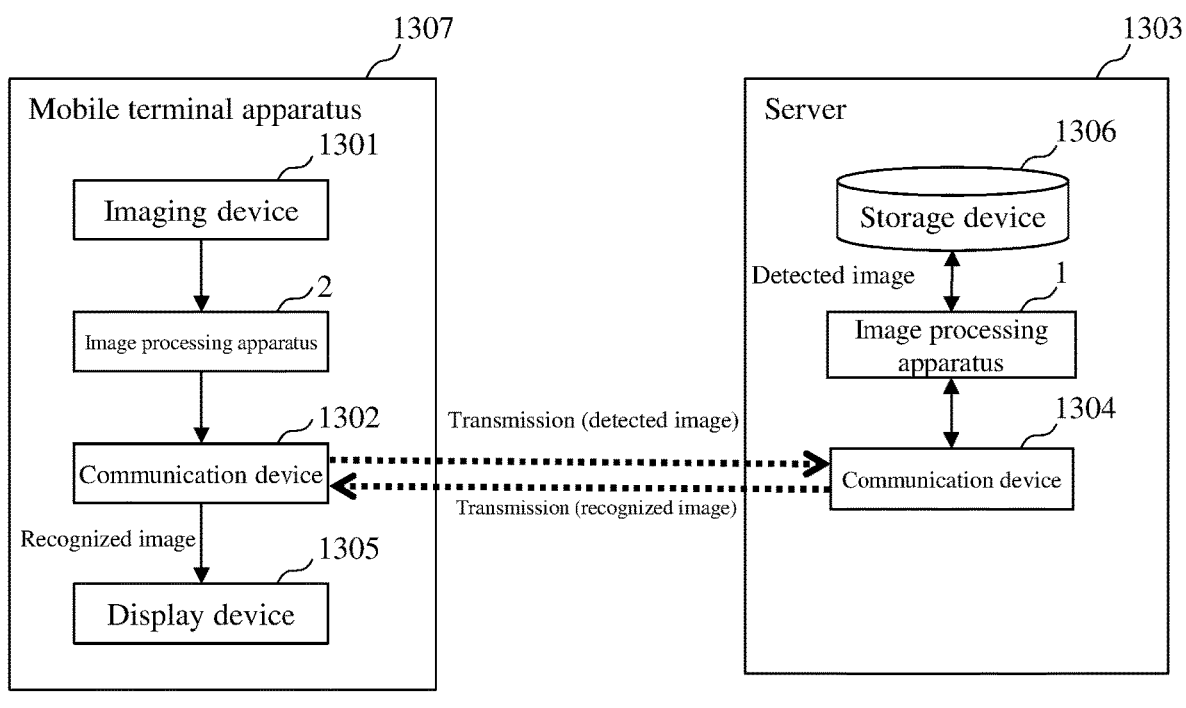
FIG. 13 is a functional block diagram showing a configuration of a POI information creation system 1300 mounted with a third image processing apparatus.

FIG. 13 is a functional block diagram showing a configuration of a POI (Point of Interest) information creation system 1300 according to the third embodiment. The POI information creation system 1300 includes a server 1303 and a mobile terminal apparatus 1307. A POI refers to a specific location (point) that is of interest to somebody. The POI information creation system 1300 generates POI information with the mobile terminal apparatus 1307 and adds the POI information to map information or updates POI information having been added to map information. POI information includes an image of a point of interest and positional information of the point. The mobile terminal apparatus 1307 can become informed of a POI through user behavior. For example, when the user performs an operation signifying that the user is interested on the mobile terminal apparatus 1307, the point at that time may be determined as a POI.

The mobile terminal apparatus 1307 is, for example, an apparatus such as a smartphone and includes an imaging device 1301 which photographs image data, an image processing apparatus 2 which detects an image including a detection target from the image data in a simplified manner, a communication device 1302 which transmits a detected image that is an image including the detection target to the server 1303, and a display device 1305 which displays a recognized image that is an image transmitted from the server 1303 in which an object is recognized.

In this case, the imaging device 1301 may be constituted by a CMOS sensor, a CCD camera, or the like. The image processing apparatus 2 performs processes from the input unit 10 to the object detecting unit 14 in the image processing apparatus 1 described in the first embodiment to detect an object in a target image. The image processing apparatus 2 outputs a detected image to the communication device 1302 without performing the object recognizing unit 15 and the reliability determining unit 16. Moreover, the detected image may be an entire target image or a partial image including a detected object. The communication device 1302 corresponds to the communication device 206 in the image processing apparatus 1 according to the first embodiment.

The server 1303 includes a communication device 1304 which receives the image data transmitted from the mobile terminal apparatus 1307, an image processing apparatus 1 which performs image processing according to the first embodiment of the present invention on the received image data, and a storage device (a memory, a storage apparatus, or the like) 1306 which stores a recognized image output from the image processing apparatus 1. In this case, image processing involves scrutinizing whether or not an object in an image is a target object to be detected and recognizing the object. In addition, the communication device 1304 corresponds to the communication device 206 in the image processing apparatus 1 described in the first embodiment.

The image processing apparatus 1 recognizes an object such as a road accessory from data of an image photographed by the imaging device 1301. By switching to a classifier of a specific sign of facility information, spot information, or the like in accordance with map information, the image processing apparatus 1 recognizes a specific sign indicated by the object information added to map information or another specific sign from the image data. Accordingly, information on whether or not a specific sign has been changed can be obtained.

The communication device 1304 transmits a recognized image of a recognized specific sign or the like to the communication device 1302 of the mobile terminal apparatus 1307.

The communication device 1302 of the mobile terminal apparatus 1307 transmits the received recognized image of the specific sign or the like to the display device 1305.

The display device 1305 displays the recognized image of the specific sign or the like transmitted from the server 1303 on a display screen of the mobile terminal apparatus (for example, a smartphone) 1307. More specifically, for example, the display device 1305 displays information (a mark) indicating a presence of a specified target object on map information displayed on a screen.

According to the third embodiment, by recognizing a specific sign from a video photographed by a vehicle-mounted smartphone and storing a set of a recognized image and positional information of the specific sign as object information to be added to map information, a POI information creation system can be provided.

(4) Fourth Embodiment

Figure 14:
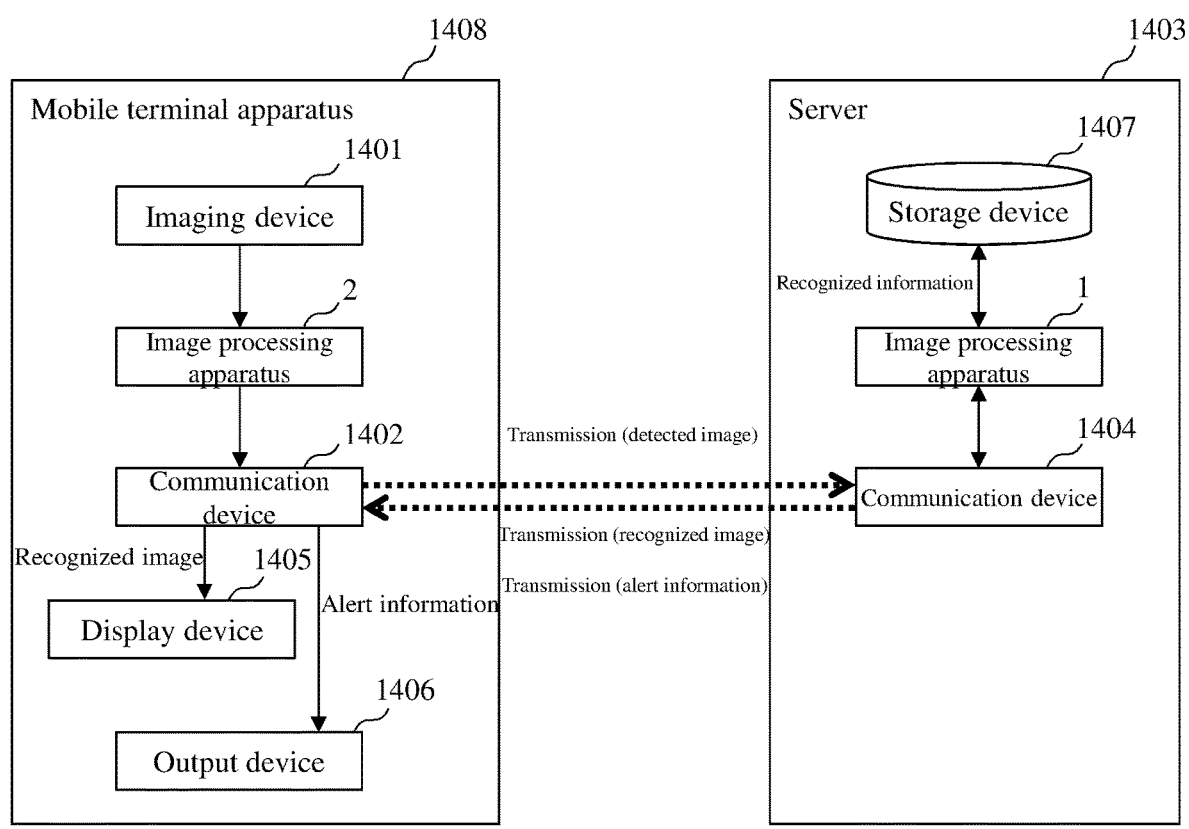
FIG. 14 is a functional block diagram showing a configuration of a warning system 1400 mounted with a fourth image processing apparatus.

FIG. 14 is a functional block diagram showing a configuration of a warning system 1400 according to the fourth embodiment. The warning system 1400 includes a server 1403 and a mobile terminal apparatus 1408. For example, as a navigation system, the warning system 1400 guides a user along a route to a destination on a map, gathers information on target objects such as signs from the user in real time, and outputs a warning (an alert) when the user approaches a location of a prescribed mark. The output of the warning is conceivably performed by, for example, displaying the warning on a screen or outputting the warning by voice.

In this case, for example, the prescribed mark may be a predetermined location or a location marked by the user during a previous travel of a vehicle. Conceivable examples of a predetermined location include general-purpose buildings such as a city hall and a police station and landmark-type buildings. The warning system according to the fourth embodiment gathers (extracts) information from the user and provides the user with beneficial information.

The mobile terminal apparatus 1408 is, for example, an apparatus such as a smartphone and includes an imaging device 1401 which photographs image data, an image processing apparatus 2 which detects an image including a detection target from the image data in a simplified manner, a communication device 1402 which transmits and receives data to and from the server 1403, a display device 1405 which displays a recognized image transmitted from the server 1403, and an output device 1406 which outputs alert information transmitted from the server 1403.

In this case, the imaging device 1401 may be constituted by a CMOS sensor, a CCD camera, or the like. The image processing apparatus 2 corresponds to the image processing apparatus 2 described in the third embodiment. The communication device 1402 corresponds to the communication device 206 in the image processing apparatus 1 according to the first embodiment.

The server 1403 includes a communication device 1404 which receives the image data transmitted from the mobile terminal apparatus 1408 and transmits recognized image data and alert information to the mobile terminal apparatus 1408, an image processing apparatus 1 which performs image processing according to the first embodiment on the received image data, and a storage device (a memory, a storage apparatus, or the like) 1407 which stores a recognized image and the like output from the image processing apparatus 1.

In this case, image processing involves scrutinizing whether or not an object included in image data is a target object and recognizing the object. In addition, the communication device 1404 corresponds to the communication device 206 in the image processing apparatus 1 described in the first embodiment.

The image processing apparatus 1 recognizes an object such as a road accessory from data of an image photographed by the imaging device 1401. In addition, while switching among classifiers for recognizing primary signs such as a speed sign and auxiliary signs in accordance with map information, the image processing apparatus 1 recognizes a primary sign and an auxiliary sign from the image data.

The display device 1405 displays a recognized image of a speed sign, an auxiliary sign, and the like transmitted from the server 1403 on a display screen (not shown) of the mobile terminal apparatus 1408 (for example, a smartphone).

The output device 1406 outputs alert information transmitted from the server 1403 from a speaker of the mobile terminal apparatus 1408 or displays the alert information on the display screen (not shown) of the mobile terminal apparatus 1408.

Furthermore, the warning system 1400 according to the present embodiment may be configured to cause an image (a detected image or a recognized image) at a point where an alert had been issued to be recorded in the server 1403 and/or the mobile terminal apparatus 1408.

According to the fourth embodiment, the warning system 1400 can be provided by recognizing a primary sign such as a speed sign and an auxiliary sign from a video photographed by a vehicle-mounted smartphone and transmitting a recognized image of the primary sign and auxiliary sign together with alert information to a smartphone or the like.

(5) Fifth Embodiment

Figure 15:
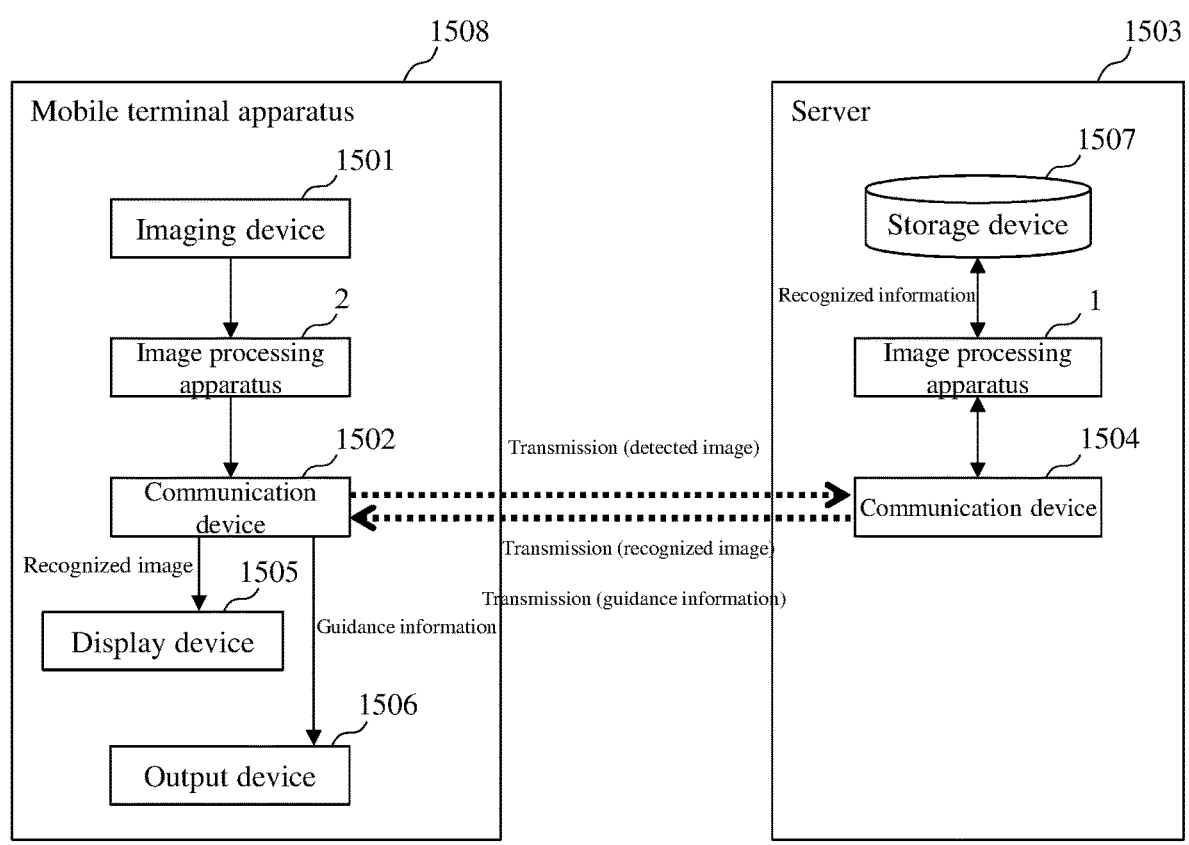
FIG. 15 is a functional block diagram showing a configuration of a simplified guidance system 1500 mounted with a fifth image processing apparatus.

FIG. 15 is a functional block diagram showing a configuration of a simplified guidance system 1500 according to the fifth embodiment. The simplified guidance system 1500 includes a server 1503 and a mobile terminal apparatus 1508. For example, when a travel route is set by a user, the simplified guidance system 1500 gathers information on target objects such as signs (primary signs and auxiliary signs) present on the route in real time and presents recognized signs to the user, and guides the user along the route. For example, the system guides the user along a configured route by voice rather than guiding the user on a map as in the case of navigation systems. For example, when a sign at a location where a left turn should be made is detected on the configured route, guidance is provided to the user by a voice saying "Turn left here" or the like.

The mobile terminal apparatus 1508 is, for example, an apparatus such as a smartphone and includes an imaging device 1501 which photographs image data, an image processing apparatus 2 which detects an image including a detection target from the image data in a simplified manner, a communication device 1502 which transmits and receives data to and from the server 1503, a display device 1505 which displays a recognized image transmitted from the server 1503, and an output device 1506 which outputs guidance information transmitted from the server 1503. In this case, the imaging device 1501 may be constituted by a CMOS sensor, a CCD camera, or the like. The image processing apparatus 2 corresponds to the image processing apparatus 2 described in the third embodiment. The communication device 1502 corresponds to the communication device 206 in the image processing apparatus 1 according to the first embodiment.

The server 1503 includes a communication device 1504 which receives the image data transmitted from the mobile terminal apparatus 1508 and transmits recognized image data and guidance information to the mobile terminal apparatus 1508, an image processing apparatus 1 which performs image processing according to the first embodiment on the received image data, and a storage device 1507 which stores a recognized image and the like output from the image processing apparatus 1. In this case, image processing involves scrutinizing and recognizing whether or not an object is a target object. The storage device 1507 is a memory, a storage apparatus, or the like. In addition, the communication device 1504 corresponds to the communication device 206 in the image processing apparatus 1 described in the first embodiment.

The image processing apparatus 1 recognizes an object such as a road accessory from data of an image photographed by the imaging device 1501. In addition, while switching among classifiers for recognizing signs such as a destination sign (a road guide sign) in accordance with map information, the image processing apparatus 1 recognizes a destination sign from the image data. Furthermore, the image processing apparatus 1 interprets an arrow or characters in the recognized destination sign by pattern matching and determines a direction in which the user is to be guided and a timing at which voice is to be output.

The display device 1505 displays a recognized image of a destination sign or the like transmitted from the server 1503 on a display screen (not shown) of the mobile terminal apparatus 1508 (for example, a smartphone).

The output device 1506 outputs guidance information transmitted from the server 1503 from a speaker of the mobile terminal apparatus 1508 or displays the guidance information on the display screen (not shown) of the mobile terminal apparatus 1508.

According to the fifth embodiment, a simplified guidance system can be provided by recognizing a sign such as a destination sign from a video photographed by a vehicle-mounted smartphone and transmitting a recognized image of the sign together with guidance information to a smartphone or the like.

(6) Summary (i) According to the first embodiment, an image processing apparatus executes the processes of: converting a color space of a target image and acquiring color information in the converted color space; calculating a first average value indicating an average value of brightness of color information in a target region that is in the target image and includes an object to be detected; comparing brightness in color information of each pixel in the target region with the first average value and generating a corrected image in which contrast has been corrected; and extracting an object based on the corrected image. More specifically, as indicated in expression 3, using information on a target image (an image N: a present image), a corrected image (an image in which contrast of color is further enhanced) is generated by correcting the contrast so that pixels that are darker than an average value of brightness of color information (an a value or a b value) become darker and pixels that are lighter than the average value become lighter. In doing so, contrast correction may be performed by introducing a magnification value v and by also taking into consideration an average value of brightness of color information of previous images (images up to an image N-1). Since a desired object is extracted (detected) from a target image by performing contrast correction in this manner, even when brightness of an image in a video changes depending on a direction of travel of a moving vehicle, a background in the image can be separated from an object in the background and the object in the background can be detected. When taking previous images into consideration, a region in an image can be separated for each image in accordance with brightness of the images which vary time-sequentially.

In addition, the image processing apparatus executes the processes of: calculating difference values of primary colors of each pixel in a target region that is in a target image and includes an object to be detected; comparing the difference values with a threshold to generate a color-masked corrected image; and detecting an object based on the corrected image. More specifically, as indicated in expression 4, using information on a target image (an image N: a present image), a corrected image is generated in which pixels similar to white and black are retained but other pixels are masked. Since a desired object is extracted (detected) from this corrected image, even when brightness of an image in a video changes depending on a direction of travel of a moving vehicle, a background in the image can be separated from an object in the background and the object in the background can be detected.

Furthermore, the image processing apparatus classifies an object by switching among classifiers of signs in accordance with map information and recognizing an object extracted (detected) from the target image. Accordingly, an extracted object can be classified as to what the object is.

In addition, the image processing apparatus may use positional information (such as GPS information) acquired when photographing a target image N to accumulate positions of an object classified by many and unspecified users or positions of a classified object according to results of a plurality of processes by a same user, and determine a reliability of the classified object in accordance with detection frequencies by a smartphone and a server which are obtained as a result of the accumulation. Accordingly, information on a correct position of the classified object can be provided to the user.

(ii) According to the second embodiment, by detecting a primary sign such as a speed sign and an auxiliary sign from a video photographed by a vehicle-mounted smartphone, a warning apparatus based on sign recognition can be provided.

(iii) According to the third embodiment, by detecting a specific sign indicating facility information or spot information from a video photographed by a vehicle-mounted smartphone, a POI information creation system based on recognition of a specific sign can be provided.

(iv) According to the fourth embodiment, by detecting a primary sign such as a speed sign and an auxiliary sign from a video photographed by a vehicle-mounted smartphone, a warning system based on sign recognition can be provided.

(v) According to the fifth embodiment, by detecting a sign such as a destination sign from a video photographed by a vehicle-mounted smartphone, a simplified guidance system based on recognition of a destination sign can be provided.

(vi) The respective embodiments described above can be modified as follows.

While the color space converting unit 11 creates an image in which an input image is converted into a Lab color space, the input image may be converted into an image of another color space such as an HSV color space, in which case a similar effect is produced.

While the object recognizing unit 15 recognizes an object using a 3-class classifier A and an N-class classifier B, a classifier A of other classes such as a 2-class classifier A may be used or a combination of classifiers may be used to recognize an object, in which case a similar effect is produced.

While the object recognizing unit 15 switches among classifiers of objects in accordance with sign information on a map to classify an object in a target image, the object recognizing unit 15 may determine an object using a plurality of classifiers of objects without switching among classifiers of objects in accordance with sign information on a map and may classify the object using a maximum value of determination results thereof (for example, values ranging from 0 to 1), in which case a similar effect is produced.

(vii) In addition, configurations and operations of the image processing apparatus or the image processing system presented in the respective embodiments described above can be organized into the following aspects.

First Aspect

An image processing apparatus, including:
a storage unit configured to store map information to which object information indicating an object and a position thereof is added, and a plurality of different classifiers for classifying an object in an image;
an object detecting unit configured to detect an object in a target image; and
an object recognizing unit configured to select any of the classifiers based on a photographing position that is a position at which the target image has been photographed and the object information added to the map information and, using the selected classifier, recognize the object detected by the object detecting unit.

Accordingly, since an object is detected from an image, a favorable classifier is selected based on information on the object and a position thereof added to map information, and the object is classified using the classifier, an object can be accurately recognized from an image.

Second Aspect

In the first aspect,
the object recognizing unit is configured to extract, from among object information added to the map information, object information of an object present at a position calculated from the photographing position, and select a classifier suitable for classifying an object indicated in the extracted object information.

Accordingly, since classification of an object is performed using a classifier suitable for recognizing an object that is most likely to be present, an object can be recognized with accuracy.

Third Aspect

In the first aspect,
the classifier is provided for each classification target, the classification target being each sign likely to be present in an image, and the classifier is configured to determine whether an object in the target image is a sign that is the classification target or a sign that is not the classification target.

Since a classifier is provided for each likely classification target and classification is performed by a classification analysis method capable of classifying, with high accuracy, whether or not an object in a target image is the classification target, an object can be recognized with high accuracy. Although object information currently being added to map information need not be updated when an object indicated by the object information is actually present on a road, an unnecessary update process occurs if an object on a road is falsely recognized as another object. In the present example, occurrences of such unnecessary update processes can be effectively reduced.

Fourth Aspect

The image processing apparatus according to the first aspect, further including a contrast correcting unit configured to correct a pixel value with respect to an image of a target region which is in the target image and in which an object may be present, so that the pixel value becomes darker by a prescribed amount when the pixel value is darker than a prescribed value but the pixel value becomes lighter by a prescribed amount when the pixel value is lighter than the prescribed value, and to supply an image after correction to the object detecting unit.

Since an image of a target region is corrected so that pixels with a dark pixel value become darker and light pixels become lighter, contrast in the target region is enhanced and an object can be more readily correctly detected.

Fifth Aspect

In the fourth aspect,
the contrast correcting unit is configured to correct the pixel value of the image of the target region so that, with respect to an a value and a b value which indicate brightness of color in a Lab color space, the pixel value becomes darker by a prescribed amount when the pixel value is darker than an average value in the target region but the pixel value becomes lighter by a prescribed amount when the pixel value is lighter than the average value, and to supply an image after correction to the object detecting unit.

Since an image of a target region is corrected so that pixels of which brightness of color is darker than an average value of the target region become darker and pixels that are lighter than the average value of the target region become lighter, contrast in the target region is enhanced based on average brightness of the target region and a type of an object can be more readily correctly detected.

Sixth Aspect

In the fourth aspect, the object recognizing unit is configured to classify, based on the image after correction from the contrast correcting unit, an object of which a type is distinguished based on a color and a shape of a pattern.

Since contrast is enhanced due to the correction, a corrected image preferable for classifying an object of which a type is distinguished based on a color and a shape of a pattern is obtained and an object can be recognized with high accuracy.

Seventh Aspect

In the fourth aspect, the object recognizing unit is configured to recognize, based on the image after correction from the contrast correcting unit, a primary sign among road signs that are each the object.

Since a difference in brightness of color is enhanced due to the correction, a primary sign that is mainly expressed by a color and a shape of a pattern can be recognized with high accuracy.

Eighth Aspect

In the fourth aspect, a plurality of images are consecutively photographed at prescribed time intervals, the contrast correcting unit is configured to calculate a third average value that blends, in a prescribed ratio, a first average value obtained by averaging pixel values of the target region in a previous image and a second average value obtained by averaging pixel values of the target region in a current image, and the object detecting unit is configured to detect an object from the target image using a threshold based on the third average value.

When detecting an object in a stage prior to recognizing the object, since the object is detected based on a threshold obtained by blending a previous image and a current image in a prescribed ratio, an effect of a temporal variation in an image is alleviated and an accuracy of detection of an object can be increased.

Ninth Aspect

The image processing apparatus according to the first aspect, further including a color analyzing unit configured to, with respect to each pixel in a target region which is in the target image and in which an object may be present, correct pixel values of all three primary colors of RGB to 0 when one or more absolute values of differences in pixel values among the primary colors exceed a prescribed threshold, and to supply an image after correction to the object detecting unit.

Since color portions in an image of a target region including portions that appear in a different color due to light conditions or the like are replaced with black and, accordingly, white regions and black regions in the white regions are retained, characters and shapes of symbols become clearer and an object can be more readily correctly detected.

Tenth Aspect

In the ninth aspect, the object recognizing unit is configured to recognize, based on the image after correction from the color analyzing unit, an object of which a type is distinguished based on characters or a shape of a symbol.

Since color portions are replaced by black due to the correction and characters and a shape of a symbol become clearer, an object of which a type is distinguished based on characters or a shape of a symbol can be recognized with high accuracy.

Eleventh Aspect

In the ninth aspect, the object recognizing unit is configured to recognize, based on the image after correction from the color analyzing unit, an auxiliary sign among road signs that are each the object.

Since color portions are replaced by black due to the correction and characters and a shape of a symbol become clearer, an auxiliary sign that is mainly expressed by characters or a shape of a symbol can be recognized with high accuracy.

Twelfth Aspect

The image processing apparatus according to the first aspect, further including an updating unit configured to maintain the map information so that object information of an object with a highest detection frequency among objects having been recognized from previous to current target images and being present at a same position in the target images is added to the map information.

While objects such as a sign on a road or a store sign may change, since object information of an object with a high detection frequency at a same position is maintained as object information to be added to map information, object information can be maintained so as to be consistent with an object that is actually present.

Thirteenth Aspect

An image processing system, including:

a terminal apparatus; and a server to which the terminal apparatus is coupled via a communication network, wherein the terminal apparatus is configured to photograph a target image and detect an object in the target image, and notify the server when the object is detected, and the server is configured to store, in advance, map information to which object information indicating an object and a position thereof is added, and a plurality of different classifiers for classifying an object in an image, and when notified from the terminal apparatus that the object has been detected, select any of the classifiers based on a photographing position that is a position at which the target image has been photographed and the object information added to the map information and, using the selected classifier, recognize the object detected by the terminal apparatus.

Fourteenth Aspect

An image processing method, including the steps of:

storing map information to which object information indicating an object and a position thereof is added, and a plurality of different classifiers for recognizing an object in an image;

detecting an object in a target image;

selecting any of the classifiers based on a photographing position that is a position at which the target image has been photographed and the object information added to the map information; and recognizing the detected object using the selected classifier.

Fifteenth Aspect

The image processing system according to the thirteenth aspect, wherein the terminal apparatus is configured to acquire an image of a point that is of interest to a user and a photographing position of the image, and notify the server when an object is detected with the image as a target image, the server is configured to transmit an image of the recognized object to the terminal apparatus, and the terminal apparatus is configured to display information created using the image of the object received from the server.

Sixteenth Aspect

The image processing system according to the thirteenth aspect, wherein the server is configured to generate alert information corresponding to the recognized object and transmit the alert information and an image of the recognized object to the terminal apparatus, and the terminal apparatus is configured to display the image of the object received from the server and, at the same time, output the alert information.

Seventeenth Aspect

The image processing system according to the thirteenth aspect, wherein an object that is a target to be detected and classified is a road guidance sign, the server is configured to generate guidance information corresponding to the recognized road guidance sign and transmit the guidance information and an image of the recognized road guidance sign to the terminal apparatus, and the terminal apparatus is configured to display the image of the road guidance sign received from the server on a display screen and, at the same time, output the guidance information.

(viii) The image processing apparatus 1 according to the respective embodiments can also be realized by a software program code that realizes the functions of the embodiments. In this case, a system or an apparatus is provided with a storage medium on which the program code is recorded, and a computer (or a CPU or an MPU) of the system or the apparatus reads the program code stored in the storage medium. In this case, the program code itself having been read from the storage medium is to realize the functions of the embodiments described above, and the program code itself and the storage medium storing the program code are to constitute the present invention. As the storage medium for supplying such a program code, for example, a flexible disk, a CD-ROM, a DVD-ROM, a hard disk, an optical disk, a magneto-optical disk, a CD-R, a magnetic tape, a non-volatile memory card, and a ROM are used.

Alternatively, an OS (operating system) or the like running on a computer may perform a part of or all of actual processes based an instruction by a program code and the functions of the embodiments described earlier may be realized by such processes. In addition, after a program code read from a storage medium is written into a memory on a computer, a CPU of the computer or the like may perform a part of or all of actual processes based an instruction by the program code and the functions of the embodiments described earlier may be realized by such processes.

Furthermore, by distributing, via a network, a program code of software that realizes functions of the embodiments, the program code may be stored in storage means such as a hard disk and a memory of a system or an apparatus or in a storage medium such as a CD-RW and a CD-R and, upon use, a computer (or a CPU or an MPU) of the system or the apparatus may read the program code stored in the storage means or the storage medium and execute the program code.

Finally, the processes and techniques described herein are not related to any specific apparatus and may be implemented by any suitable combination of components. Furthermore, various types of general-purpose devices can be used according to the methods described herein. There may be case where constructing a dedicated apparatus is beneficial for executing the steps of the methods described herein. In addition, various inventions can be formulated by appropriately combining the plurality of components disclosed in the embodiments. For example, several components may be deleted from all components described in the embodiments. Furthermore, components of different embodiments may be combined as appropriate. While the present invention has been described in relation to specific examples, such description is, in all respects, illustrative rather than restrictive. It will be obvious to those skilled in the art that a large number of combinations of hardware, software, and firmware suitable for implementing the present invention are available. For example, described software can be implemented in a wide range of programs or scripting languages such as an assembler, C/C++, perl, Shell, PHP, and Java (registered trademark).

In addition, the control lines and information lines shown in the embodiments described above are those considered necessary for purposes of illustration and do not necessarily represent all control lines and information lines on a product. All of the components may be coupled to each other.

Furthermore, other implementations of the present invention will become apparent to those of ordinary skill in this technical field upon reading the specification and the embodiments of the present invention disclosed herein. The various aspects and/or components of the embodiments described above can be used individually or in any combination thereof.

What is claimed is:

1. An image processing apparatus, comprising:
a storage unit configured to store map information including object information indicating an object and a position of the object stored in association with each other, and a plurality of different classifiers for classifying an object in an image;
an object detecting unit configured to detect an object in a target image;
an object recognizing unit configured to select any of the classifiers based on a photographing position that is a position at which the target image has been photographed and the object information included in the map information and, using the selected classifier, recognize the object detected by the object detecting unit;
a contrast correcting unit configured to correct a pixel value of an image of a target region which is in the target image and in which an object may be present, so that the pixel value becomes darker by a prescribed amount when the pixel value is darker than a prescribed value but the pixel value becomes lighter by a prescribed amount when the pixel value is lighter than the prescribed value, and to supply an image after correction to the object detecting unit.

2. The image processing apparatus according to claim 1, wherein
the object recognizing unit is configured to extract, from among object information added to the map information, object information of an object present at a position calculated from the photographing position, and select a classifier suitable for classifying an object indicated in the extracted object information.

3. The image processing apparatus according to claim 1, wherein
the classifier is provided for each classification target, the classification target being each sign likely to be present in an image, and the classifier is configured to determine whether an object in the target image is a sign that is the classification target or a sign that is not the classification target.

4. The image processing apparatus according to claim 1, wherein
the contrast correcting unit is configured to correct the pixel value of the image of the target region so that, with respect to an a value and a b value which indicate brightness of color in a Lab color space, the pixel value becomes darker by a prescribed amount when the pixel value is darker than an average value in the target region but the pixel value becomes lighter by a prescribed amount when the pixel value is lighter than the average value, and to supply an image after correction to the object detecting unit.

5. The image processing apparatus according to claim 1, wherein
the object recognizing unit is configured to classify, based on the image after correction from the contrast correcting unit, an object of which a type is distinguished based on a color and a shape of a pattern.

6. The image processing apparatus according to claim 1, wherein
the object recognizing unit is configured to recognize, based on the image after correction from the contrast correcting unit, a primary sign among road signs that are each the object.

7. The image processing apparatus according to claim 1, wherein
a plurality of images are consecutively photographed at prescribed time intervals,
the contrast correcting unit is configured to calculate a third average value that blends, in a prescribed ratio, a first average value obtained by averaging pixel values of the target region in a previous image and a second average value obtained by averaging pixel values of the target region in a current image, and
the object detecting unit is configured to detect an object from the target image using a threshold based on the third average value.

8. The image processing apparatus according to claim 1, further comprising a color analyzing unit configured to, with respect to each pixel in a target region which is in the target image and in which an object may be present, correct pixel values of all three primary colors of RGB to 0 when one or more absolute values of differences in pixel values among the primary colors exceed a prescribed threshold, and to supply an image after correction to the object detecting unit.

9. The image processing apparatus according to claim 8, wherein
the object recognizing unit is configured to recognize, based on the image after correction from the color analyzing unit, an object of which a type is distinguished based on characters or a shape of a symbol.

10. The image processing apparatus according to claim 8, wherein
the object recognizing unit is configured to recognize, based on the image after correction from the color analyzing unit, an auxiliary sign among road signs that are each the object.

11. The image processing apparatus according to claim 1, further comprising an updating unit configured to maintain the map information so that object information of an object with a highest detection frequency among objects having been recognized from previous to current target images and being present at a same position in the target images is added to the map information.

12. An image processing system, comprising:
a terminal apparatus; and
a server to which the terminal apparatus is coupled via a communication network, wherein
the terminal apparatus is configured to photograph a target image and detect an object in the target image, and notify the server when the object is detected, and
the server is configured to:
store, in advance, map information to which object information indicating an object and a position of the object stored in association with each other, and a plurality of different classifiers for classifying an object in an image, and when notified from the terminal apparatus that the object has been detected,
select any of the classifiers based on a photographing position that is a position at which the target image has been photographed and the object information included in the map information,
using the selected classifier, recognize the object detected by the terminal apparatus,
correct a pixel value of an image of a target region which is in the target image and in which an object may be present, so that the pixel value becomes darker by a prescribed amount when the pixel value is darker than a prescribed value but the pixel value becomes lighter by a prescribed amount when the pixel value is lighter than the prescribed value, and
supply an image after correction to the object detecting unit.

13. An image processing method, comprising:
storing map information to which object information indicating an object and a position of the object stored in association with each other, and a plurality of different classifiers for recognizing an object in an image;
detecting an object in a target image;
selecting any of the classifiers based on a photographing position that is a position at which the target image has been photographed and the object information included in the map information;
recognizing the detected object using the selected classifier;
correcting a pixel value of an image of a target region which is in the target image and in which an object may be present, so that the pixel value becomes darker by a prescribed amount when the pixel value is darker than a prescribed value but the pixel value becomes lighter by a prescribed amount when the pixel value is lighter than the prescribed value; and
supplying an image after correction to the object detecting unit.

14. The image processing system according to claim 12, wherein
the terminal apparatus is notified of object information recognized by the server, and
the terminal apparatus is configured to display an image and information of the object received from the server and, at the same time, output information created by the server.

* * * * *